United States Patent [19]

Sikes

[11] Patent Number: 5,773,564
[45] Date of Patent: Jun. 30, 1998

[54] ABSORBENT GELLING MATERIALS OF CROSSLINKED POLYASPARTATE

[75] Inventor: C. Steven Sikes, Mobile, Ala.

[73] Assignee: University of South Alabama, Mobile, Ala.

[21] Appl. No.: 596,439

[22] Filed: Feb. 2, 1996

[51] Int. Cl.[6] .................................................. C08G 63/44
[52] U.S. Cl. .............................................. 528/363
[58] Field of Search ............................................ 528/363

[56] References Cited

U.S. PATENT DOCUMENTS 5,552,516  9/1996  Ross et al. ............................ 528/363

*Primary Examiner*—Terressa Mosley
*Attorney, Agent, or Firm*—Oblon, Spivak, McClelland, Maier & Neustadt, P.C.

[57] ABSTRACT

Absorbent gelling materials are prepared by crosslinking polyaspartate units. The crosslinked homopolymers exhibit improved gel volumes, gel strengths and extractable material characteristics. Using diamine crosslinkers in an amount of 2.5–30 percent by weight, the blue-dextran saline gel volumes of at least 15 can be obtained. Similarly, gel strengths of 300 N/m² or better, including gel strengths above 3000 N/m², can be obtained. The resulting product is susceptible of a variety of uses, is biodegradable, and can be prepared in a particle size suitable for use in a diaper.

11 Claims, 14 Drawing Sheets

CROSSLINKERS 1.3-diaminopropane 1.4-diaminobutane 1.5-diaminopentane 1.6-diaminohexane 1.7-diaminoheptane spermidine spermine lysine

NMP 1-methyl-2-pyrrolidinone
N-methylpyrrolidone

MMP 4-methylmorpholine

SULFOLANE tetramethylene sulfone

DMF

N,N-dimethylformamide

DCC

EDC

EEDQ $y = 0.632x + 0.429$ y-intercept = log K

ABSORBENT GELLING MATERIALS OF CROSSLINKED POLYASPARTATE

BACKGROUND OF THE INVENTION

1. Field of the Invention

The present invention relates to crosslinked polyaspartate molecules that form an insoluble network that absorbs large amounts of water and physiological saline. Included are methods for preparing light-colored, high-molecular-weight, and high-viscosity forms of polyaspartate that are part of the invention. On crosslinking, these molecules yield absorbent gelling materials (AGM's) that are greatly superior to materials composed of lower molecular-weight, lower viscosity, crosslinked polyaspartate molecules. Specific diamine crosslinkers and methods of crosslinking are also identified as part of the invention. Finally, a crosslinked polyimide form of the materials is identified that is an absorbent and thickening material for non-polar and hydrophobic solvents. The materials of the invention are useful in many applications including but not limited to paper products such as baby diapers, incontinence briefs, and catamenial articles; permeability modifiers in oil field operations; thickening and gelling agents in foods; controlled release substances in agricultural and medical applications; dehydration agents in fuels and other materials; adsorbent materials for spills of oil and fuel; viscosity modifiers in coatings and paints; suspension and thickening agents for cosmetics and lotions.

2. Discussion of the Background

Absorbent gelling materials typically consist of polyanionic chains of polymers such as polyacrylate that are crosslinked to form negatively charged granules that absorb water and saline. A widely commercialized form of polyacrylate AGM's that are crosslinked by molecules such as bisacrylamide was disclosed by Brandt et al. (1988). These absorbent gelling materials have been used in paper products such as baby diapers. The abundant literature on AGM's has been the subject of a number of reviews, for example *Superabsorbent Polymers*, a book edited by Buchholz and Peppas (1994).

Brandt et al. provided a method for measuring absorption of physiological saline, representative of urine, based on the exclusion of very high-molecular-weight molecules of blue dextran from swollen gel particles. In this method, an increase in the optical density of the excluded water, caused by the increased levels of excluded blue dextran, is used to calculate the volume of water absorbed, the gel volume. Although there are many methods reported for measuring absorption of water by absorbent gelling materials, and many reports of very high absorption of water as measured by various methods, the blue dextran method has become a standard method. A blue-dextran gel volume of 20 to 40 for absorption of a 1 percent by weight solution of NaCl is at present a competitive value for an absorbent gelling material. Gel volumes of commercialized AGM's in baby diapers currently in use fall in this range.

In addition to adequate gel volume, an AGM also must have sufficient gel strength so that the gel is firm enough and particularly does not lose fluid when under a mild pressure (Kellenberger, 1992). Again, there are various ways of measuring gel strength. One involves a pulse shearometer, a device that measures gel strength based on the propagation of a pulsed wave, through the gel, detected by a piezoelectric transducer (Pen Kem, 1986). By this method, polyacrylate AGM's often have a gel strength in the range of 3000 to 5000 Newtons-m$^{-2}$ when swollen to their blue-dextran gel volume.

Another feature required of AGM's is that they do not dissolve or release extractable materials. Dissolution may result in decreased performance over time. Extractable materials could be irritants, for example, in human hygiene applications. In general, extractable substances and dissolution should be limited to less than 10 percent of the mass of the AGM'S, preferably less than 1 percent (Brandt, et al., 1988), and most preferably negligible.

There are other properties of the AGM's that are needed for use in diapers. For example, the particle size distribution must be compatible with manufacture of the diaper. An acceptable range would be a narrow distribution around a particle diameter of 400$\mu$ (Brandt et al.). In addition, the pH of the gelled fluid preferably should be nearly neutral, most preferably in the range of pH 6 to 7.

The polyacrylate-based AGM's have met each of these standards and are good materials. A problem with them that has been perceived, however, is that they are not degradable, biologically or environmentally, and may lead to persistent problems in landfills or other environments.

In fact, The Office of Technology Assessment of the U.S. Congress issued a background paper in 1993 about the need for more environmentally compatible polymer materials. In this paper, the development of biological polymers for uses in many fields, including AGM'S, was reviewed (Anonymous, 1993).

To address this issue, a number of AGM's composed of biological polymers have been made. These include materials made of polysaccharides (Kesavan and Prud'homme, 1992; Prud'homme et al., 1989; Gross and Harland, 1992), polymers of biological organic acids (Kamath and Park, 1993), and polyelectrolytic polyamino acids (Donachy and Sikes, 1993, 1994; Kamath and Park, 1993).

An approach that seems to hold particular promise is the production of AGM's based on the polyanionic polymer of aspartic acid (Sikes and Wheeler, 1985, 1989; Sikes, 1993, 1994). This biopolymer is produced by a simple thermal polycondensation reaction (FIG. 1) using a monomer that is competitively priced (Harada, 1959; Harada and Fox, 1965; Fox and Harada, 1960, 1966; Boehmke, 1989; Freeman et al., 1994; Schornick, et al., 1994), and is therefore commercially available. It can be synthesized in forms that are completely biodegradable (Holland and Tighe, 1992; Krone and Walsh, 1993; Freeman, et al., 1994, Schornick, et al., 1994; Wolk et al., 1994).

Prior work (Donachy and Sikes 1993, 1994; Sikes and Wierzbicki 1996) has shown that AGM's composed mainly of anionic amino acids such as aspartate could be made by thermal methods by use of the amino acid lysine, a diamine, as crosslinker. A problem with this approach, however, is that lysine forms a cyclic lactam on heating (Harada, 1959; Fox and Harada, 1966) by a dehydration reaction between its own carboxyl and its E amine groups. Much of the lysine, therefore, is in effect not a bifunctional, diamine crosslinker, although it may become attached to polyaspartate via its other amine group. This tends to give relatively low yields of AGM'S.

A more serious limitation in prior studies with polyaspartate-based AGM's, was that the polyaspartate used, polymerized by dry thermal polycondensation, had a molecular weight of only 3000 to 6000 daltons. AGM's produced with these low molecular weight polyaspartates, as shown in the present study, do not have high gel volumes and gel strengths of the levels that occur in polyacrylate-based AGM's.

Methods of production of polyaspartate date to Schiff (1897) who heated aspartic acid and other precursors. Later, Harada and coworkers (op. cit.) reported the efficacy of solvents such as phosphoric and polyphosphoric acid in generating polymers of somewhat larger size, estimated at up to 12,000 daltons. Such studies have led to numerous approaches to optimization of the synthesis of polyaspartate (Bortnick et al., 1995; Holy et al., 1995; Kalota and Martin, 1994; Koskan, 1991; Koskan et al., 1992, 1993; Koskan and Meah, 1993; Paik et al., 1995; Wood 1994a, 1994b; Wood and Calton, 1995). The work of Neri et al. (1973), Knebel and Lehman (1992), and Nagatomo et al. (1995) in particular produced polyaspartates of molecular weight of 25,000 or more, including the use of polyphosphoric acid to promote the polymerization.

In the present study, polyaspartates of various molecular sizes, produced by a variety of synthetic routes, were evaluated for their utility in the synthesis of AGM's having the desired properties. None of the prior studies defined the surprisingly specific set of reaction conditions reported herein that are required to produce a polyaspartate that is preferred in the synthesis of the subject AGM's.

Nagatomo et al. (1995) also have reviewed prior studies of polyamino acid AGM's and reported a process for production of materials described as superabsorbents, based on measurements of increase in weight of the material when placed in water after blotting or decanting excess water. There were no measurements of gel strength or extractable materials in this study.

The materials of Nagatomo et al. were produced by reacting polysuccinimide with a diamine compound at room temperature for a period of time (for example, 1 hour) that was purposefully limited to prevent the reaction from proceeding to completion, for the stated reason that this made isolation of the product easier. The resulting material was then subjected to mild alkaline treatment for 24 hours at room temperature to open at least some of the imide rings of polyaspartimide, which would generate a material of a partially crosslinked copolyamide-imide of aspartic acid. Stronger hydrolytic conditions were purposefully avoided (for example, pH 10, 80° C., 2 hours) because this resulted in rendering the materials soluble.

There have been prior reports of reacting polysuccinimide or its precursors with amines or diamines (Neri et al., 1973; Fujimoto and Teranishi, 1974, 1975; Calton and Wood, 1994; Wood 1994b, 1994c, 1995) for production of soluble materials for a variety of uses related to surface reactivity such as emulsification, crystallization inhibition, dispersancy, solubilization and the like. None of these studies teach the production of gelling materials or thickening agents.

The materials produced by the method of Nagatomo et al. also are not described nor are they claimed as crosslinked polyaspartates. As shown in the present study, they also do not possess the combination of properties of sufficient gel volume, gel strength, low extractable substances, and other desired properties of the crosslinked polyaspartates of the present invention. The materials of the present invention purposefully are crosslinked enough to be stable to conditions of alkaline hydrolysis that are strong enough (pH 10–12, 0 to 5 hours, 60°–95° C.) to completely open imide rings of polyaspartimide.

Thus, there has been a need for improving AGM's made with aspartic acid. Specifically needed are higher molecular-weight polyaspartic acids that upon crosslinking produce AGM's in high yield with high gel strength, high gel volume, low extractable materials, and other properties desired in commercial AGM's. Also needed are better crosslinking agents and methods of crosslinking that result in high yields of the AGM's with the desired qualities.

SUMMARY OF THE INVENTION

Accordingly, it is an object of the present invention to provide new absorbent gelling materials.

It is another object of the present invention to provide methods for the synthesis of such materials.

It is another object of the present invention to provide a method for the synthesis of high-molecular weight and high-viscosity polyaspartic acid and its corresponding polyimides, which are the polymer components of the materials.

It is another object of the present invention to provide absorbent gelling materials for use in baby diapers, incontinence briefs, catamenial articles and other personal hygienic goods.

It is another object of the present invention to provide absorbent gelling materials for use as permeability modifiers in oil field applications (Bric, et al., 1983; Stokke, et al., 1987).

It is another object of the present invention to provide absorbent gelling materials for use as controlled release substances in agricultural applications (Levy, 1991).

It is another object of the present invention to provide absorbent gelling materials for use in biomedical applications (Barbier et al., 1993; Lehmann et al., 1992; Kamath and Park, 1993; Krone and Walch, 1993). It is another object of the present invention to provide absorbent gelling materials for use as thickening agents in foods (Furia, 1980; Kyogoku and Harada, 1991, 1992a, 1992b) and cosmetics (Williams 1972).

It is another object of the present invention to provide absorbent gelling materials for use as viscosity modifiers in paints and coatings.

It is another object of the present invention to provide absorbent gelling materials for use as dehydration agents or thickening agents in fuels.

It is another object of the present invention to provide absorbent gelling materials for use in absorption of hydrophobic solvents and oil (Hozumi et al., 1994).

It is another object of the present invention to provide absorbent gelling materials that have high gel volumes, high gel strengths, and low amounts of extractable compounds.

These and other objects of the present invention, which will become apparent during the course of the following detailed description, have been achieved by producing new AGM's that consist of polyaspartate molecules of approximately 25,000 to 30,000 daltons, with a intrinsic viscosity of approximately 60 ml/g, and that have been crosslinked through 3 to 30 percent of their residues by use of diamine compounds, preferably, although polyamines may be used.

The diamine compounds are selected from the group consisting of, but not limited to, diaminopropane, diaminobutane (putrescine), diaminopentane, diaminohexane, diaminoheptane, lysine and other diamines that provide two functional crosslinking sites, or mixtures thereof.

The AGM so produced is insoluble and has a saline gel volume by the blue-dextran method of at least 15, a gel strength of at least 3000 N/m$^2$ when the gel volume is at least 20, and percent extractable materials less than 10 percent by weight of the AGM.

DESCRIPTION OF THE PREFERRED EMBODIMENTS

Figure 1:
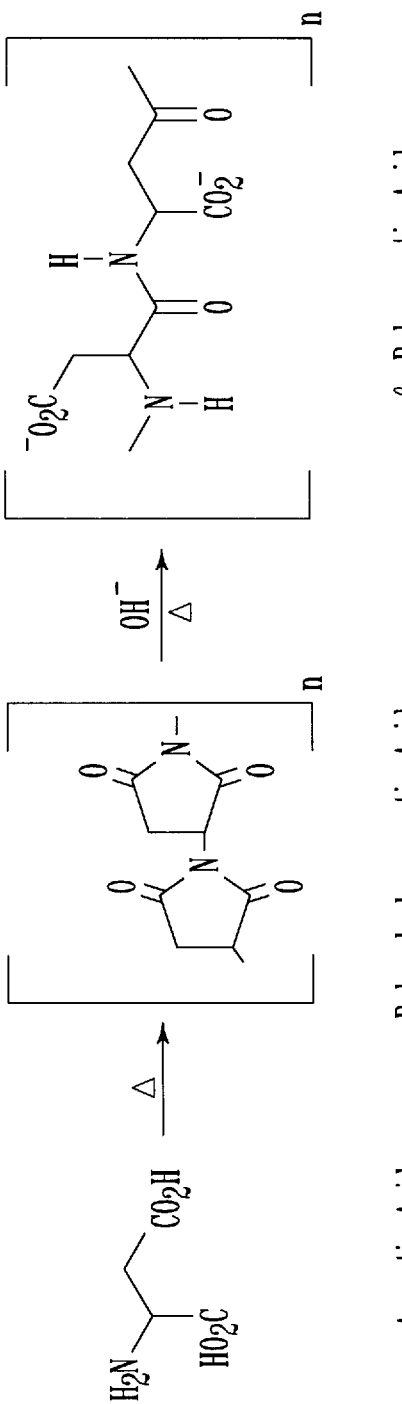
FIG. 1. Thermal polycondensation of aspartic acid to form polyaspartimide (polysuccinimide, polyanhydroaspartic acid), followed by mild alkaline hydrolysis to yield polyaspartate.
Figure 2A:
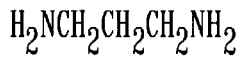
FIG. 2. Reactants and solvents.
Figure 2B:
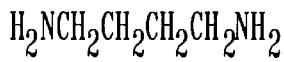
Figure 2C:
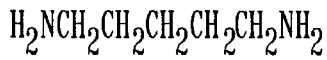
Figure 2D:
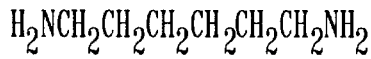
Figure 2E:
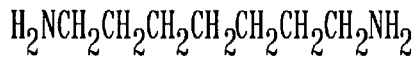
Figure 2F:
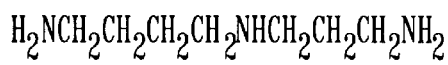
Figure 2G:
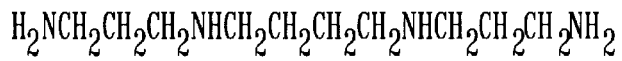
Figure 2H:
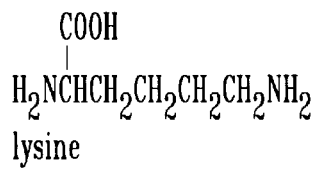
Figure 2I:
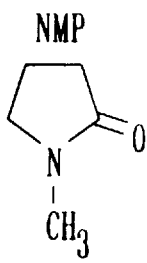
Figure 2M:
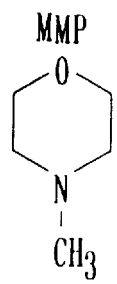
Figure 2J:
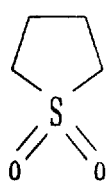
Figure 2N:
Figure 2K:
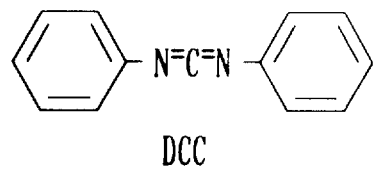
Figure 2O:
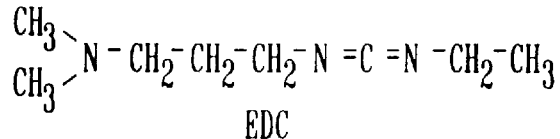
Figure 2L:
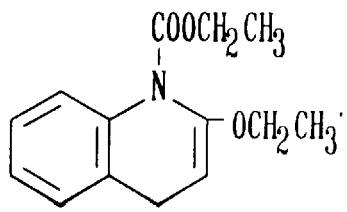

Thus, the present invention identifies and describes new AGM's composed of polyaspartate crosslinked by diamines to make an insoluble network that can absorb large amounts of water, biological fluids, and physiological saline. Alternatively, if the AGM is in the form of polyaspartimide (synonyms: polysuccinimide, polyanhydroaspartic acid, anhydropolyaspartic acid) rather than polyaspartate, it can absorb large amounts of nonpolar, hydrophobic solvents.

In a preferred embodiment, the polyaspartate or polyaspartimide has a molecular weight of about 25,000 daltons, an intrinsic viscosity of 40 ml/g, and is crosslinked at 10 percent of the residues by diaminobutane.

In another preferred embodiment, the polyaspartate, or polyaspartimide has a molecular weight of 30,000 daltons, an intrinsic viscosity of 60 ml/g, and is crosslinked at 5 percent of the residues by diaminopentane.

The degree of crosslinking is sufficient to render the materials insoluble. crosslinking can vary from 2.5 to 25 percent of the residues, or higher. Saline (1 percent $Na^+$ by weight) gel volume varies from 5 to 100, preferably from 20 to 50, most preferably from 30 to 40. Gel strength varies from 50 to 12,000 $N/m^2$ preferably from 300 to 10000 $N/m^2$, most preferably from 2000 to 6000 $N/m^2$. Extractable materials range from 0 to 20 percent by weight of the AGM'S, preferably from 0 to 10 percent, most preferably less than 1 percent.

The gel volumes, gel strengths, and percent extractable materials can be controlled easily by proper selection of the ratios of the polyaspartate and the diamine crosslinker, the time and temperature of the reactions, the molecular weight of the polyaspartate, and the type of crosslinker. This and other aspects of the invention will be described in more detail below.

As noted above, the present AGM's are useful for absorption of water and biological fluids and may be used in diapers, sanitary napkins, and other devices. If the polymer is in the imide form, the AGM's will absorb hydrophobic solvents and may be useful in absorption of oil, gelling of fuel and thickening of paints, among other uses.

As also demonstrated in the present invention, polyaspartate of higher molecular weight can greatly increase the viscosity of aqueous liquids while still remaining soluble. In addition, polyaspartate with low levels of crosslinking may be insoluble and form very loose gels of high gel volume but negligible gel strength. Although such polyaspartates are not useful as AGM's in products such as diapers, they are useful as soluble thickening agents and viscosity modifiers in a number of applications that range from food additives to additives to cosmetics.

The present AGM's may be prepared by thermal condensation reactions between free carboxyl groups of polyaspartate and amines of the crosslinkers. They may also be prepared by chemical condensation reactions. They may also be prepared by a ring-opening, nucleophilic attack of the primary amines of the crosslinker on the aspartimide rings of the polyaspartimide dissolved in an organic solvent, at room temperature or with mild heating.

The thermal condensation is generally achieved when the temperature is between 150° and 240° C. and the time of the reaction is between 6 and 48 hours. The ratio of the polyaspartate and the crosslinker is in the range of 10 to 0.5 on a molar residue basis. The reactants first are dissolved in water and dried together to form a salt by lyophilization, or by mild heating at 60° to 120° C. in a drying oven. Preferably the temperature of reaction is 150° to 200° C., most preferably 170° to 190° C. The reactant ratios of polyaspartate and the crosslinker are preferably in the range of moles as aspartic acid to moles of the crosslinker between 150:1 to 10:3, most preferably the ratio is 10:0.5. The preferred polyaspartate has a high molecular weight and high intrinsic viscosity. The preferred crosslinkers are diaminobutane, diaminopentane, diaminohexane, anddiaminoheptane; most preferably diaminobutane.

The thermally formed AGM's of the present invention may also be made in the presence of a dehydration reagent, particularly polyphosphoric acid. In this case, the reactants are again dissolved together in water and dried to form a salt as above. Prior to condensation, polyphosphoric acid, in the amount of 20 to 40 percent by weight of the reactants, is added and mixed with the reactants by spatula to form a paste. The preferred reaction conditions are 170° to 220° C. for 3 to 24 hours, preferably 190° C. for 4.5 hours.

The AGM's can also be formed by chemical condensation reactions at room temperatures in organic solvents or in water. In this case, the imide form of polyaspartate, polyaspartimide is dissolved in an organic solvent. Preferably, the solution is from 5 to 10 percent by weight polyaspartimide, most preferably 7.5 percent. Preferably the solvent is N-methyl pyrrolidone (NMP) or dimethylformamide, most preferably NMP (FIG. 2, reactants and solvents). Once the polyaspartimide is dissolved, which can be assisted by gentle heating at 60° to 80° C., a crosslinker is added in the ratio of 80:1 to 5:1, preferably 20:1, polyaspartimide to crosslinker, most preferably 10:1. Next, a crosslinking agent is added to facilitate the reaction between a few exposed COOH groups of the polymer, as shown by titration data, that persist in the otherwise polyimide form, and the amine groups of the crosslinker. The crosslinker is selected preferably from the series diaminopropane through diaminoheptane, most preferably diaminobutane.

The crosslinking agents may be dicyclohexylcarbodiimide (DCC) or 1- ethyl-3-(3-dimethyl aminopropyl) carbodiimide hydrochloride (EDC), among others, (FIG. 2, reactants and solvents). Most preferably, the ratio of crosslinking agent to crosslinker is between 10:1 and 1:1 preferably 4:1, most preferably 2:1.

When EDC is used as crosslinking agent, it is possible to use a solvent system of 50 percent water and 50 percent acetone (by volume). In these cases, polyaspartate rather than polyaspartimide can be used as the polymer. Reaction ratios are 10 to 5:10 to 5:2 to 1, preferably 5:5:1 of polyaspartate (as moles of aspartic residues), crosslinking agent, and crosslinker, most preferably 2:2:1.

Finally, the AGM's of the present invention may be formed by nucleophilic attack of a primary amine on the imide ring of aspartimide. In this reaction, the preferred reaction conditions are 5 to 10 percent weight/volume polyaspartimide in DMF or NMP plus a crosslinker selected from the series of diaminopropane through diaminoheptane, most preferably 7.5 percent polyaspartimide by weight/volume in NMP with diaminobutane. The reactant ratios are from 20:1 to 2:1, preferably 10:1 most preferably 10:0.76 of polyaspartimide (residue basis) and the crosslinker. The reactions may be conducted at 10° to 80° C., most preferably at 40° C.

When polyaspartimide is used as the polymer, following crosslinking, the material may be used for forming gels with hydrophobic or nonpolar solvents. The crosslinked material is purified from the organic solvent by adding water or methanol to the reaction vessel. This precipitates the AGM and allows removal of the solvent by washing on a filter or in a centrifuge tube.

For formation of gels in water or saline, the imide rings of the AGM must be opened to yield free COO— groups. This is done by mild alkaline hydrolysis at pH 10–12, 40° to 95° C., 10 to 360 minutes, most preferably pH 10, 80° C., 2 hours.

Other features of the invention will become apparent in the course of the following descriptions of exemplary embodiments which are given for illustration of the invention and are not intended to be limiting thereof.

EXAMPLES

Synthesis of Polyaspartimide and Polyaspartate

The approaches that produce the most effective AGM in highest yield depend on crosslinking a prepolymerized polyaspartimide or polyaspartate that, in the polyaspartate form, have high molecular weights and intrinsic viscosities, as herein reported. As shown below, polyaspartates of lower molecular weights and intrinsic viscosities do not produce AGM's with the same favorable properties of high gel volumes and gel strengths.

The optimal conditions for production of a polyaspartimide and the corresponding polyaspartate for use in making an AGM were determined by extensive experimentation as summarized in Table 1.

The preferred reaction conditions are first to mix aspartic acid with 20 to 40 percent by weight polyphosphoric acid, which has been preheated to 80° C. to reduce its viscosity and render it more easily poured or pipetted. Next, the reaction vessels are placed in a vacuum oven at 190° C. for 3 to 6 hours, most preferably 4.5 hours. During the reaction, the materials bubble upward as the water of dehydration is released and removed, resulting in a porous, foam-like mass. This promotes even heating, which results in a uniform, light-colored product.

The polyphosphoric acid is present in an amount just sufficient to mix and interact with all of the aspartic acid, while providing conditions of acid catalysis, in which carboxyl groups are in the COOH form and amine groups in the $NH_3^+$ form. The polyphosphoric acid also is proposed to act to facilitate removal of the water of dehydration during amide and imide bond formation by conversion to phosphoric acid upon uptake of water, followed by restoration to polyphosphoric acid when the water is again lost via heating and removed by vacuum. Thus the polyphosphoric acid is thought both to enhance mixing of the aspartic acid and also to catalytically promote dehydration.

Formation of High-MW, High-Viscosity Polyaspartate

Example 1

Polyaspartimide Formation

A sample of 30 g of L-aspartic acid was placed in a round pyrex dish (7.5 cm 15 cm) on a thermostated hot plate at 80° C. (J-Kem temperature controller). To this, 4.5 ml of polyphosphoric acid (Sigma Chemical Company, density=2.06), preheated to 80° C., was pipetted and thoroughly mixed manually using a spatula to form a paste. The dish was then placed in a vacuum oven (VWR Scientific, model 1430) set at 190° C., with a vacuum of 28 inches of Hg. After 4.5 hours, the dish was removed from the oven and the sample allowed to cool. The sample was transferred to a filter funnel and washed by filtration through a cellulose filter (Whatman #3) with water until the pH of the filtrate was neutral. The product was collected and lyophilized. Yield=20.6 g of polyaspartimide, percent phosphorus=0.

Example 2

Conversion of Polyaspartimide to Polyaspartate

The product of example 1 in the form of a powder was mixed with 200 ml of water in a beaker to form a slurry. The beaker was placed on a hotplate thermostated at 80° C. and equipped with magnetic stirring. A pH electrode was placed in the water and pH monitored continuously. NaOH (10N) was added dropwise to keep the pH at ~10.0. By the end of 1 hour, all of the polyimide had been hydrolyzed to polyaspartate, (FIG. 1) which was completely soluble. The solution was placed in dialysis bags (Spectrum, MW cut-off=1000) and dialyzed against 4 l of distilled water, with 3 changes of water at intervals of 2 hours. After dialysis, the solution in the bags was lyophilized. Yield=20.1 g, Na=<5 percent by weight by flame emission photometry. MW by viscometry, >100,000; MW by gel permeation, 25,000 daltons; MW by low angle laser light scattering, 27,000 daltons;

intrinsic viscosity=45 ml/g; passage time of a 2 percent solution in the viscometer, 200 seconds. See Table 2 for comparative results.

Example 3

Ten grams of the product of example 1 was subjected to the conditions and procedures of example 2 except that the temperature was 23° C. (room temperature) and the time was 24 hours. The pH was held at pH 10 by autotitration with NaOH (10N). After this period, only a fraction of the material was solubilized. The material was allowed to settle for 30 minutes and the supernatant decanted. The remaining material was washed with 500 ml of isopropanol (100 percent) for 15 minutes with stirring, then settling for 15 minutes, followed by decanting. This washing was repeated twice, then the material was dried. The insoluble product weighed 6.2 g and was composed of polyaspartimide as shown by its infrared spectrum and titration analysis.

Example 4

A sample of 250 g of L-aspartic acid was placed in a pyrex baking dish (10.5×15×2 inches). The dish was placed in an oven, preheated to 100° C. After 10 minutes, the preheated aspartic acid was mixed with 37.5 ml of polyphosphoric acid, preheated to 80° C. The dish was placed on a hotplate thermostated at 80° C. while the aspartic acid and polyphosphoric acid were mixed manually with a spatula to form a paste. The dish was then placed in the vacuum oven at 190° C. for 6 hours at a vacuum of 28 inches of Hg. The sample was filter-washed and lyophilized as in example 1. The resulting polyaspartimide was used in some experiments as is, or converted to the form of polyaspartate as in example 2 for use in other experiments. Yield as polyaspartate was >90 percent of theoretical, the actual amount in grams varied depending on the amount of polyaspartimide that was converted to polyaspartate for use in individual experiments.

AGM's with Crosslinks Formed by Thermal Condensation Reactions

Example 5

Polyaspartate (1.70 g) of example 2 was dissolved in 10 ml of water in a test tube (2.5×10 cm). To this was added 0.242 g of 1,4 diaminobutane-2HCl. This gave a molar ratio of 10 residues of aspartic acid per molecule of diaminobutane (10:1). The sample was lyophilized to yield a salt of the reactants. This salt, in the test tube, was placed in a heating block set at 170° C. and reacted for 24 hours. At 24 hours, the sample was removed by adding 10 ml of distilled water and washing the insoluble material onto a filter (Whatman #3). The material was washed further and lyophilized. The lyophilized product was next base-hydrolyzed (pH 10, 80° C., 1 hour). The remaining material was poured into a 500 ml centrifuge tube (Beckman J2-21 centrifuge, JA 10 rotor, polycarbonate tubes) and neutralized to ~pH 2 by dropwise addition of 1N HCl, the pH checked by spotting droplets onto pH paper. The material was centrifuge-washed at pH 2 because, at neutral pH or higher, it is a gelling material and as such is not filterable or subject to centrifugation. However, at pH 2, it becomes an easily settled floc, white to cream-colored. The centrifuge-washing consisted of spinning at 5000 rpm for 10 minutes, decanting the supernatant, resuspending the floc in 300 ml of 0.01N HCl, and repeating the process a total of 3 times. After centrifuge-washing, the AGM pellet was lyophilized. Yield, 0.39 g: gel volume, 27.9 (saline, blue dextran): charge density, 6.67 $\mu$moles COO—/mg.

Example 6

The procedures and reaction conditions of example 5 were followed, except that a separate batch of polyaspartate prepared as in example 2 was used and the temperature of condensation was 180° C. In addition, the molar-residue ratio of polyaspartate to 1,4-diaminobutane-2HCl was 10:0.5 (3.4 g to 0.242 g). Samples were taken at 7, 22, and 30 hours. Sample at 7 hours: yield=0 (no insoluble AGM was produced). Sample at 22 hours: yield=0.38 g; gel volume (saline, blue dextran)=34.8; charge density=7.59 $\mu$moles COO$^-$/mg. Sample at 30 hours: yield=0.48 g; gel volume=29.8; charge density 7.57 $\mu$moles COO$^-$/mg.

Example 7

The reaction was conducted as in example 6, except that the amounts of the reactants were doubled. In addition, at the end of 24 hours of thermal condensation, the material in the test tube was subjected to base hydrolysis (pH 10, 80° C., 10 min.) to reopen the imide rings that formed during the thermal reaction. The base-hydrolyzed material was lyophilized then resubjected to further thermal condensation in the heating block with samples taken at 24, 48, and 72 hours. By this procedure, the gelling properties of the AGM's remained the same as in example 6. The yields were improved. Yield at 24 h of reheating=2.4 g, 35.3 percent of theoretical: 2.88 g at 48 h, 42.4 percent: 2.94 g at 72 h, 43.2 percent.

Example 8

The reactions and procedures of example 6 were followed, except that polyphosphoric acid was added as a dehydration reagent to possibly promote crosslinking. Temperatures of the condensation ranged from 150° to 190° C. Amounts of polyphosphoric acid varied from 30 to 120 percent by weight of the reactants, polyaspartate and diaminobutane. At temperatures of 150° to 170° C., no AGM's resulted. At 190° C., for up to 24 hours, with 30 percent by weight polyphosphoric acid, AGM's with gel volumes between 8 and 16 were produced in low yields (less than 30 percent of theoretical).

AGM's Formed Non-Thermally by Condensation Reactions Promoted by Use of Chemical Crosslinking Agents

Example 9

Polyaspartimide, 105 mmoles (10.2 g) on a residue basis (MW=97), of Example 2 was dissolved in 144 ml of NMP at 70° C. for 4 hours in a 600 ml beaker. On cooling 9 mmoles (0.902 ml) of the free base form of 1,4 diaminobutane (MW=88.15, d=0.88, Aldrich) was pipetted into the solution. Next, 18 mmoles (18 ml of 1.0M DCC solution in NMP) of dicyclohexyl carbodiimide was added. The beaker was placed on a magnetic stirring plate with smooth stirring at room temperature. After 3 hours, the entire solution had formed a uniform amber gel. The reaction was allowed to continue for 24 hours. At 24 hours, the gel in the beaker was chopped manually by spatula, then transferred onto a cellulose filter (Whatman #3) in a filter funnel, and washed with 800 ml of methanol. The methanol was poured onto the gel particles, which were then agitated by hand and allowed to soak for 30 minutes. The methanol was next drawn through the filter under mild vacuum (10 psi, Gast vacuum pump). The sample on the filter was placed in a 1000 ml beaker, then washed off the filter with 400 ml of methanol by hand pipetting. The gel in the beaker was shaken in the 400 ml of methanol on a rotary shaker table at 120 rpm for 30 minutes. The methanol was then decanted and the procedure repeated two more times. The methanol washing serves to remove residual NMP, unreacted DCC, dicyclohexyl urea (the reaction product of DCC), and any unreacted polyaspartimide or diaminobutane. After washing, the AGM was lyophilized to produce a coarse, firm, granular cream-colored product. This product was ground to a fine powder in a coffee grinder.

For gelling of hydrophobic and nonpolar solvents, the AGM may be used in the form of the crosslinked polyimide, as above produced. In this form, it was capable of gelling, for example, NMP and DMF in the amounts of at least 10 ml solvent per 1.0 g of AGM. It did not gel water, methanol, and dichloromethane under these conditions.

For gelling of water and saline, the AGM was base-hydrolyzed at pH 10, 80° C., for up to 1 hour. In this case, the base hydrolysis was monitored by pH electrode and stopped when the pH remained stable at pH 10, indicating no further opening of imide rings to expose COOH groups which cause the pH to drift downward. At this point, the sample was acidified with 1N HCl to pH 2 to precipitate the AGM.

The AGM then was centrifuge-washed with 0.01N HCl as reported in example 5. Yield=9.44 g (78 percent of theoretical yield): gel volume=35.5: gel strength=2334 $N/m^2$: charge density=7.45 $\mu$moles $COO^-$/mg, 0.28 percent by weight extractable materials.

Example 10

The reaction conditions and procedures of example 9 were followed except that the ratio of polyaspartimide to DCC to diaminobutane was 105 mmoles:15.75 mmoles:7.875 mmoles. Following base-hydrolysis to produce the AGM for water and saline, the following properties were obtained. Yield=6.22 g: gel volume=59.0: gel strength=348 $N/m^2$: charge density=7.32 $\mu$moles $COO^-$/mg: <1 percent extractable materials.

Example 11

The reaction conditions and procedures of example 9 were followed except that the ratio of polyaspartimide to DCC to diaminobutane was 105 mmoles:13.5 mmoles:6.75 mmoles. The AGM for water and saline had the following properties. Yield=6.69 g: gel volume (saline)=55.6: gel strength=452 $N/m^2$: <1 1 percent extractable materials.

Example 12

The reaction conditions and procedures of example 9 were followed except that the ratio of polyaspartimide:DCC:diaminobutane was 105 mmoles:11.25 mmoles:5.625 mmoles. The properties of the resulting AGM for water and saline were as follows. Yield=5.38 g: gel volume (saline)=70.9: gel strength <300 $N/m^2$: charge density=6.79 $\mu$moles $COO^-$/mg: <1 percent extractable materials.

Example 13

The reaction conditions and procedures of example 9 were followed except that the ratio of polyaspartimide:DCC:diaminobutane was 105 mmoles:9 mmoles:4.5 mmoles. The properties of the resulting AGM for water and saline were as follows. Yield=5.21 g: gel volume (saline)=87.6: gel strength <300 $N/m^2$: charge density=6.99 $\mu$moles $COO^-$/mg: 1.05 percent extractable materials.

Example 14

The reaction conditions and procedures of example 9 were followed, including the ratio of 105 mmoles:18 mmoles:9 mmoles of polyaspartimide:DCC:diaminobutane. The reaction itself was conducted for 24 hours at 40° C. instead of room temperature. The material formed a firmer gel in the NMP and did not adhere to the beaker, spatula, filter funnel, or paper, making it easier to chop and wash. The properties of the resulting AGM for water and saline were as follows. Yield=11.12 g (92 percent of theoretical): gel volume (saline)=24.1: gel strength 5767 $N/m^2$: charge density=7.23 $\mu$moles $COO^-$/mg: <1 percent extractable materials.

Example 15

The reaction conditions and procedures of example 9 were followed except that the crosslinker was 1,5-diaminopentane (free base, MW 102.2). The reaction ratio was 17.5 mmoles:3 mmoles:1.5 mmoles of polyaspartimide:DCC:diaminopentane. The properties of the resulting AGM for water and saline were as follows. Yield=1.63 g (90.7 percent of theoretical): gel volume=35.6: charge density=6.7 $\mu$moles $COO^-$/mg: <1 percent extractable materials.

Example 16

The reaction conditions and procedures of example 9 were followed except that the reaction ratio was 105 mmoles:9 mmoles:4.5 mmoles and the crosslinker was 1,6-diaminohexane. The properties of the resulting AGM for water and saline were as follows. Yield=7.43 g: gel volume=50.7: gel strength=860 $N/m^2$: charge density=7.56 $\mu$moles $COO^-$/mg: <1 percent extractable materials.

Example 17

The reaction conditions and procedures of example 9 were followed except that the ratio of polyaspartimide:DCC:crosslinker was 17.5 mmoles:1.5 mmoles:0.75 mmoles, with 1,7-diaminoheptane as the crosslinker. The properties of the resulting AGM for water and saline were as follows. Yield=1.54 g (63.9 percent of theoretical): gel volume (saline)=31.7: charge density=6.44 $\mu$moles $COO^-$/mg: <1 percent extractable materials.

Example 18

The reaction conditions and procedures of example 9 were followed. However, a low MW polyaspartimide was prepared according to the method of Donachy and Sikes (U.S. Pat. No. 5,247,068) by heating L-aspartic acid at 240° C. for 6 hours. The ratio of reactants was 11.67 mmoles:2 mmoles:1mmole of polyaspartimide to DCC to diaminobutane. There was no insoluble product: no AGM was produced.

Example 19

The reactions and procedures of example 18 were followed, except that lysine was used as the crosslinker. Lysine was made soluble in NMP by addition of 600 $\mu$l of 12N HCl per 12 ml of NMP. There was no insoluble product: no AGM was produced. Amino acid analysis of the soluble product revealed that less than 0.04 mole percent of the residues were lysine. Therefore, negligible crosslinking occurred.

Example 20

The reactions and procedures of example 9 were followed, including the use of the high MW polyaspartimide, except that lysine was used as the crosslinker. There was no insoluble product: no AGM was produced. Amino acid analysis of the soluble product revealed that 0.07 mole percent of the residues were lysine. Therefore negligible crosslinking occurred.

Example 21

The reactions and procedures of example 20 were followed, except that the ratio of reactants was 17.5 mmoles to 6 mmoles to 3 mmoles of polyaspartimide to DCC to lysine. The product was predominantly solubilized during the washing procedure and after mild alkaline hydrolysis, there was 0.103 g of insoluble product. This material did not act as an AGM in the gel volume assay. Amino acid analysis of the insoluble product revealed that 0.20 mole percent of the residues were lysine, indicating that a small amount of crosslinking occurred, but that it was inadequate to result in an AGM.

Example 22

In a 250 ml beaker, 5 mmoles of lysine-HCl (0.913 g) were dissolved in 75 ml of distilled water. To this, 10 mmoles (1.14 g) of polyaspartate (MW 114 of Asp per residue in $Asp_n$) were added. Next, 75 ml of acetone were added and the pH adjusted to 4.75 with 1M $H_2SO_4$. Ten mmoles (1.92 g) of EDC (1-ethyl-3-(3-dimethyl aminopropyl) carbodiimide hydrochloride) were dissolved in 25 ml of water. This EDC solution was added dropwise to the solution containing the polyaspartate and lysine, while maintaining the pH at 4.75 with 1M $H_2SO_4$, with smooth magnetic stirring. The reaction proceeded quickly but was allowed to continue overnight for convenience and completeness. Next, the crosslinked sample was collected onto filter paper (Whatman #4). The sample was washed on the filter paper six times with 300 ml of water each time. The washed sample was then subjected to mild alkaline hydrolysis at 95° C., pH 12, 2 hours. The base-hydrolyzed sample was centrifuge-washed in water at 7,000 rpm, 15 minutes, 3 times (Beckman, JA10 rotor). The product was lyophilized to produce an AGM for water and saline. Yield=0.38 g: amino acid analysis revealed that the AGM was 95.7 mole percent Asp and 4.3 mole percent Lys: gel volume (saline) =4.11: charge density=4.25 $\mu$moles $COO^-$/mg.

Example 23

The reaction conditions and procedures of example 22 were followed except that the ratio of reactants was 100 mmoles:100 mmoles:5 mmoles of polyaspartate:EDC:lysine. The volumes of water and acetone were doubled. A small amount of AGM for water and saline was produced. Yield=0.1059 g: gel volume (saline)=20.9: amino acid analysis showed that the AGM was 92.6 mole percent Asp, 7.4 mole percent Lys.

Example 24

The reaction conditions and procedures of example 22 were followed except that the reactant ratio was 50 mmoles:50 mmoles:15 mmoles of polyaspartate:EDC:crosslinker, with 1,4 diaminobutane as the crosslinker. The yield of AGM for water and saline was 0.767 g with a gel volume (saline) of 6.96 and charge density of 4.93 $\mu$moles $COO^-$/mg.

Example 25

The reaction conditions and procedures of example 22 were followed. The ratio of reactants was 50 mmoles:50 mmoles:5 mmoles of polyaspartate:EDC:crosslinker, with 1,4 diaminobutane as crosslinker. The yield of the AGM for water and saline was 0.160 g with a gel volume (saline) of 12.7 and a charge density of 6.33 $\mu$moles $COO^-$/mg.

Example 26

The reaction conditions and procedures of example 22 were followed. The ratio of reactants was 50 mmoles:50 mmoles:25 mmoles of polyaspartate:EDC:crosslinker, with 1,3 diaminopropane as crosslinker. The yield of the AGM for water and saline was 0.617 g with a gel volume (saline) of 3.74 and charge density of 5.48 $\mu$moles $COO^-$/mg.

AGM's Formed by Nucleophilic Crosslinks

Example 27

Polyaspartimide (1.06 g, 10.9 mmoles of aspartimide residues, MW=97) of example 4 was added to a test tube (25×150 mm). To this was added 15 ml of NMP. The test tube was placed in a heating block at 85° C. and stirred with a spatula every 30 minutes until the polyaspartimide had dissolved (approximately 4 hours). After cooling of the solution, 94.2 $\mu$l of 1,4 diaminobutane (free base, 0.94 mmole) were added, the test tube covered with parafilm, and left at room temperature. The sample formed a clear, amber gel in the NMP after several hours. The reaction was terminated after 24 hours by adding 10 ml of methanol to form a light-colored precipitate. The precipitate was chopped in the test tube by use of a spatula, then transferred to a filter funnel and washed on a glass fiber filter (Gelman, type A/E) with slow addition of 300 ml of methanol. The sample was next lyophilized, ground to a powder by mortar and pestle, base-hydrolyzed (pH 10, 80° C., 45 minutes), and neutralized to pH 7 with 1N HCl. On cooling, the sample was centrifuge-washed at pH 2, then lyophilized. The resulting AGM for water and saline was obtained with a yield of 0.99 g: gel volume (saline)=32.5: gel strength=3521N/m$^2$: and a charge density of 5.29 $\mu$moles $COO^-$/mg.

Example 28

The reaction conditions and procedures of example 27 were followed, except that 3 test tubes of polyaspartimide and diaminobutane in NMP were prepared and set in a heating block at 60° C. The samples gelled by 50 minutes. Samples were taken at 3, 6, and 24 hours by precipitation by addition of 10 ml of methanol (3 hour sample) or 10 ml of water (6 and 24 hour samples). The samples were filter-washed with 900 ml each of water. The AGM's for water and saline had the following properties. AGM at 3 hours: yield= 0.85 g: gel volume (saline)=39.2: charge density=6.34 $\mu$moles $COO^-$/mg. AGM at 6 hours: yield=0.89 g: gel volume (saline)=36.6: charge density 6.39 $\mu$moles $COO^-$/mg. AGM at 24 hours: yield=0.85 g: gel volume (saline) 36.8: charge density=6.60 $\mu$moles $COO^-$/mg.

Example 29

The reaction conditions and procedures of example 28 were followed except that the amount of crosslinker, 1,4 diaminobutane, was reduced two-fold to 0.47 mmoles. During the reaction in NMP, gels were not formed even after 120 hours. No AGM's resulted.

Example 30

The reaction conditions and procedures of example 28 were followed except that the reaction was conducted at 150° C. At this temperature, the reactions did not form gels in NMP. No AGM's resulted.

Example 31

To produce a larger amount of AGM with the preferred gel volume and gel strength as well as preferred particle size, pH, and Na content for use in diapers, the following steps were taken.

1. Polyaspartimide was synthesized by mixing 250 g of L-aspartic acid with 37.5 ml of polyphosphoric acid (density=2.08 g/ml) at 80° C. to make a paste in a pyrex dish. The paste was then polymerized at 190° C. for 4 to 6 hours in vacuo in a vacuum oven.
2. The polyaspartimide was filter-washed with distilled water until the filtrate was pH neutral. The polyaspartimide was then lyophilized. Following lyophilization, the material contained zero phosphate by spectrophotometric analysis.
3. 173.4 g of the polyimide was dissolved in 2.45 l of N-methyl pyrrolidone at 80° C., with smooth magnetic stirring. This took ~6 hours.
4. 144 ml of this solution was poured into each of 16 beakers, placed in an incubator at 40° C., and allowed to equilibrate overnight. Using 16 smaller (600 ml) beakers rather than one larger beaker allowed replicate sampling and was useful in provision of thorough stirring upon addition of the crosslinker.
5. Next, 0.8 ml of 1,4 diaminobutane (MW 88.15, density 0.88 g/ml) at 40° C. was pipetted into each beaker, with smooth magnetic stirring. This gave an AGM of Asp:diaminobutane of 13.1:1. The solution was stirred for 1 to 5 minutes, 1 minute being sufficient. This was important because the densities are quite different (density of NMP= 1.028 g/ml) and the reactants do not mix otherwise.
6. The stirring was turned off. The reaction proceeded for 2 hours. By this time, a firm, homogeneous, amber gel was produced.
7. This gel was chopped by hand into chunks of ~0.1 to 1 cm in longest linear dimension. The chopped gel was slowly filter-washed with at least 6 liters of distilled water over a period of 2 hours. During this process, the NMP was visibly removed from the gel. NMP is miscible with water, but can be seen at first in the water due to a viscosity discontinuity.
8. The resultant x-linked material was lyophilized, producing hard, coarse, granular particles. The purpose of this step was to allow weighing of the material.
9. Next, the material was base hydrolyzed, with magnetic stirring, by placing up to 50 g in 3 liters of 2 percent NaCl in water at 80° C. in a 4-liter beaker, held at pH 10 by autotitration with 10N NaOH. This process took ~3 hours. The 2 percent NaCl was needed to keep the swelling to a manageable volume and to allow stirring. In distilled water, the entire volume becomes gelled and not stirrable. Use of 1 percent NaCl did not suppress swelling sufficiently. Use of 3 percent NaCl suppressed swelling more than 2 percent NaCl, but also added more NaCl to be removed during washing.
10. The material then was neutralized to pH 6 by autotitration with 1N HCl. This required at least 1 hour, to allow equilibration of the inner core of the particles with the outer solution. This step is necessary to insure a pH ~6 of the resulting AGM once swollen in saline or urine.
11. One liter of 50 percent isopropanol next was added to promote dehydration and settling of the gelled material. The material was stirred for 30 minutes, then allowed to settle. Approximately 2.5 liters of supernatant was decanted, beginning the removal of water and excess salt. If 100 percent isopropanol were used at this step, precipitation of salts occurred.
12. One liter of 50 percent isopropanol was added, resulting in a sticky, collapsed gel, which was stirred for 30 minutes, then allowed to settle. About 2 liters were decanted.
13. Step 12 was repeated 2 more times, yielding a slurry of several hundred ml of AGM, and completing the removal of excess salt, which is insoluble in alcohol alone.
14. To this was added 1 liter of 100 percent isopropanol, which further collapsed the AGM into a sticky, spongy mass. This was allowed to soak for at least 1 hour, decanted, and then transferred to a smaller dish (15 cm diameter). At this point, the spongy mass was broken into smaller globs by hand. The material was covered with about 400 ml of 100 percent isopropanol and soaked overnight.
15. Next, the isopropanol was decanted and the material, which was now hard, was dried at 85° C. for 24 h in an oven. Drying at 105° C. was also possible at this stage without affecting the properties of the resulting material. Lyophilization at this step resulted in powdery AGM's that did not have the preferred particle sizes.
16. The material was next ground by Wiley mill using a #20 mesh, then dried again at 85° C. overnight. Use of other mesh sizes led to particle sizes of the AGM's that were outside the preferred range.
17. The material was allowed to cool to room temperature, weighed, and placed in a sample bottle. The resulting granular material had an average particle size of 300–400 microns, as determined by light microscopy by use of an ocular micrometer. With proper care taken, it was possible to obtain yields of ~100 percent. This included $Na^+$, at 10 to 13 percent dry weight, the sodium salt being the form of the AGM that was produced. AGM's with higher sodium contents became powdery on grinding and did not fall into the preferred range of particle sizes.

Gel volume=33.5±0.5 (n=3), gel strength=3677±80.1 $N/m^2$ (n=3), pH of the gel=5.95±0.06 (n=3).

Example 32

The reaction conditions and procedures of example 31 were followed through step 9. After that, the following steps were taken to obviate the use of alcohol as a solvent for removal of water.

1. The base-hydrolyzed material in 2 percent NaCl was adjusted first to an endpoint of pH 6 by autotitration with 5N HCl, then to pH 2. This caused the gel to collapsed, producing a precipitate of the AGM that quickly settled to the bottom of the 4-liter flask upon cessation of stirring. The supernatant, ~3.5 liters, was decanted.
2. The material was washed 3 times by addition of 1 liter of 0.01N HCl, stirring for 30 minutes, settling for 15 minutes, and decanting. This removed excess salt.
3. Next, the collapsed AGM in 0.01N HCl was neutralized to pH ~6 by stoichiometric addition of 0.5N NaOH, using the moles of HCl required for the titration from pH 6 to pH 2 as a guide. Typically, upon addition of the NaOH, the material swelled within an hour to reform a firm, clear, golden gel. For an initial amount of 50 g of AGM prior to base hydrolysis, the final volume for neutralization with 0.5N NaOH was ~500 ml. To insure complete interaction of the gel particles with the 0.5N NaOH, the gel was left overnight to equilibrate.
4. The gel was then spread in a pyrex dish in a layer between 1–2 cm in depth. This was placed for 24 hours in an incubator thermostated at 60° C. through which compressed air was blown briskly by means of an inlet hose. Layering greater than ~2 cm in depth led to materials that were dry on top and spongy underneath.

5. After 24 hours of this treatment, the dried material was ground by Wiley mill using a #20 mesh, then dried again overnight at 60° C., without forced air. At this stage, it was possible to dry the material at 105° C. without damaging the gelling properties of the material.

6. On cooling, the material was weighed and placed in a sample bottle. Yields ranged from 80–90 percent of theoretical. The $Na^+$ content was 10–15 percent by weight. Gel volume=34, gel strength=3596±64 $N/m^2$ (n=3), pH of the gel=5.61±0.37 (n=6).

Example 33

The reaction conditions and procedures of example 32 were followed except that the gel as described in step 4 was dried at 90° C. After 3 hours, the gel had collapsed into a soupy slurry and the material was no longer an AGM.

Example 34

The reaction conditions and procedures of example 32 were followed except that the gel as described in step 4 was dried at 80° C. Again, as in example 33, this destroyed the gelling properties of the material.

Example 35

The reaction conditions and procedures of example 32 were followed except that the gel as described in step 4 was lyophilized rather than oven-dried. This resulted in an AGM equivalent in gel volume and gel strength to that of example 32, but the particles tended to be smaller and less granular, often more needle-like.

Example 36

The reaction conditions and procedures of example 31 were followed except that the amount of diaminobutane added at step 5 was 0.775 ml, such that the ratio of Asp:crosslinker in the AGM was 13.52:1. Gel volume=32.0±1.04 (n=3), gel strength=2886±63 $N/m^2$ (n=3).

Example 37

The reaction conditions and procedures of example 31 were followed except that the amount of diaminobutane added at step 5 was 0.725 ml, such that the ratio of Asp:crosslinker in the AGM was 14.48:1. Gel volume=30.7±0.56 (n=3), gel strength=3111±89 $N/m^2$ (n=3).

Example 38

The reaction conditions and procedures of example 31 were followed except that the amount of diaminobutane added at step 5 was 0.700 ml, such that the ratio of Asp:crosslinker in the AGM was 15:1. Gel volume=37.6±1.15 (n=3), gel strength=2339±41 $N/m^2$ (n=3).

Example 39

The reaction conditions and procedures of example 31 were followed except that the amount of diaminobutane added at step 5 was 0.600 ml, such that the ratio of Asp:crosslinker in the AGM was 17.5:1. Gel volume=45.67±0.57 (n=3), gel strength=1062±21 $N/m^2$ (n=3).

Example 40

The reaction conditions and procedures of example 31 were followed except that the amount of diaminobutane added at step 5 was 0.500 ml, such that the ratio of Asp:crosslinker in the AGM was 21:1. Gel volume=60.0±1.0 (n=3), gel strength=918.6=15 $N/m^2$ (n=3).

Example 41

The reaction conditions and procedures of example 31 were followed except that the amount of diaminobutane added at step 5 was 0.4 ml, 0.3 ml, 0.2 ml, and 0.1 ml in separate experiments. In each of these experiments, the resulting materials dissolved upon base hydrolysis at step 9, ultimately yielding water-soluble derivatives of polyaspartate.

Example 42

The reaction conditions and procedures of example 31 were followed except that the base hydrolysis of step 9 was conducted at 95° C. This resulted in destruction of the gel as the AGM itself became hydrolyzed and the material was solubilized.

Example 43

The reaction conditions and procedures of example 31 were followed except that the 16 beakers of step 4 were replaced with one 4-liter beaker. The entire 173.4 g of polyimide in 2.45 l of NMP were reacted with 12.8 ml of diaminobutane. Due to difficulty of effective magnetic stirring of the larger volume and the density differences between the solution of polyimide in NMP and the liquid diaminobutane, a heavily crosslinked, waxy layer was produced on top and a non-gelled, highly viscous layer was underneath that consisted of less-crosslinked materials in NMP. After base hydrolysis, the entire batch of AGM was precipitated at pH 2, centrifuge washed with 0.01N HCl by use of 500 ml centrifuge bottles. The material was then lyophilized. Gel volume=36.63±4.23 (n=3).

Example 44

The reaction conditions and procedures of example 43 were followed except that a sub-sample of 8.68 g of the waxy, heavily crosslinked material was taken as the polyimide. Upon base hydrolysis, acid-washing, and lyophilization, it yielded a gel volume=7.57±0.45 (n=3).

Example 45

10.2g of polyaspartimide of example 2 were dissolved in 144 ml of NMP at 80° C. in a 600-ml beaker. On cooling to room temperature, this solution was reacted with 0.8 ml of diaminobutane. In this case, the temperature of the reaction was monitored by a thermistor thermometer, with an accuracy ±0.01° C. linked to a chart recorder. The temperature did not vary more than ±0.5° C., which was the same as the variation in a control beaker to which no diaminobutane was added.

Example 46

The reaction conditions and procedures of example 45 were followed except that the beakers were placed in an incubator thermostated at 40° C. Again, the temperature did not vary more than ±0.5° C. during the reaction period of 2 hours.

Example 47

The reaction conditions and procedures of example 31 were followed except that a beaker was sampled at 1 hour, 3 hours, 8 hours, and 24 hours. The other beakers were sampled at 2 hours. The results showed that the reaction was not complete at 1 hour, the gel was loose and not firmly set. By 2 hours, the gel was firm. By 24 hours, the gel was noticeably firmer. Gel volumes at 3 hours=35.82±4.32, at 8 hours=28.69±1.26, at 24 hours=25.23±0.95 (n=3 in each case).

Example 48

The reaction conditions and procedures of example 31 were followed through step 8, producing the x-linked material in the imide form. The alkaline hydrolysis of this material was then conducted at room temperature (23° C.) in distilled water for 24 hours, rather than 80° C. in 2 percent NaCl for 3 hours as in example 31. This was done by placing 10 g in 500 ml of distilled water with stirring and autotitration with an endpoint of pH 10 by use of 10N NaOH. After 24 hours, the material had become partially hydrolyzed and had a tendency to form a gel of approximately 200 ml. The material was precipitated with 500 ml of 100 percent isopropanol and the supernatant decanted. The material was washed twice more with 500 ml each of isopropanol, then covered with 200 ml more of isopropanol and allowed to set overnight. Next, again as in example 31, the isopropanol was decanted and the material dried for 24 hours at 85° C., ground by Wiley mill using a #20 mesh, and redried overnight at 85° C. Yield=8.97 g. Gel volume=13.16±0.408 (n=6). Gel strength=10216±468 N/m$^2$ (n=3). Free amines= 4.48±0.895 $\mu$moles/g (n=3). Charge density=3.27±0.0986 $\mu$moles COO$^-$/mg. Infrared spectra revealed a prominent imide peak, showing that the ring-opening hydrolysis was incomplete, and that the material contained both aspartate and aspartimide residues.

Methods

Molecular Weight

Viscosity Analysis: The viscosity of solutions of polyaspartimide in dimethyl formamide has been related to molecular weight of the molecules in prior studies (Neri et al., 1973; Knebel and Lehmann, 1992). By this method, the time for passage through a capillary tube of a solution of known concentration of a solute of unknown molecular weight is compared to the passage times of similar solutions of appropriate standards of known molecular weight. A standard curve is produced by which the molecular weights of unknown molecules can be estimated.

In the present study, the approach of Neri et al. was applied to polyaspartate molecules in water. The intrinsic viscosities of solutions were determined by measuring the passage times and densities of the solutions. A plot of viscosity of the solution, $(pt/p_0t_0-1)/c$, versus concentration (c) was made for solutions varying from 0.89 to 2 percent by weight in water; where p=density of the sample solution, t=passage time of the sample solution; $P_0$=density of the solvent, and $t_0$=passage time of the solvent. The intrinsic viscosity is the y-intercept of the plots of viscosities versus concentrations.

The intrinsic viscosity can then be used to estimate molecular weight in accord with the equation below.

$\mu$=intrinsic viscosity a=slope log [$\mu$]=a log M+log K log M=molecular weight log K=y-intercept Values for a and K in the above equation were established by plotting a standard curve of log [$\mu$] versus log [M] for polyaspartate and polyglutamate molecules of known molecular weight. These standards were obtained from Sigma Chemical and had MW values from 6000 to 31,000 (polyaspartates) and 48,000 to 98,000 daltons (polyglutamates), as assessed by viscosity analysis and low-angle, laser-light scattering.

Figure 3:
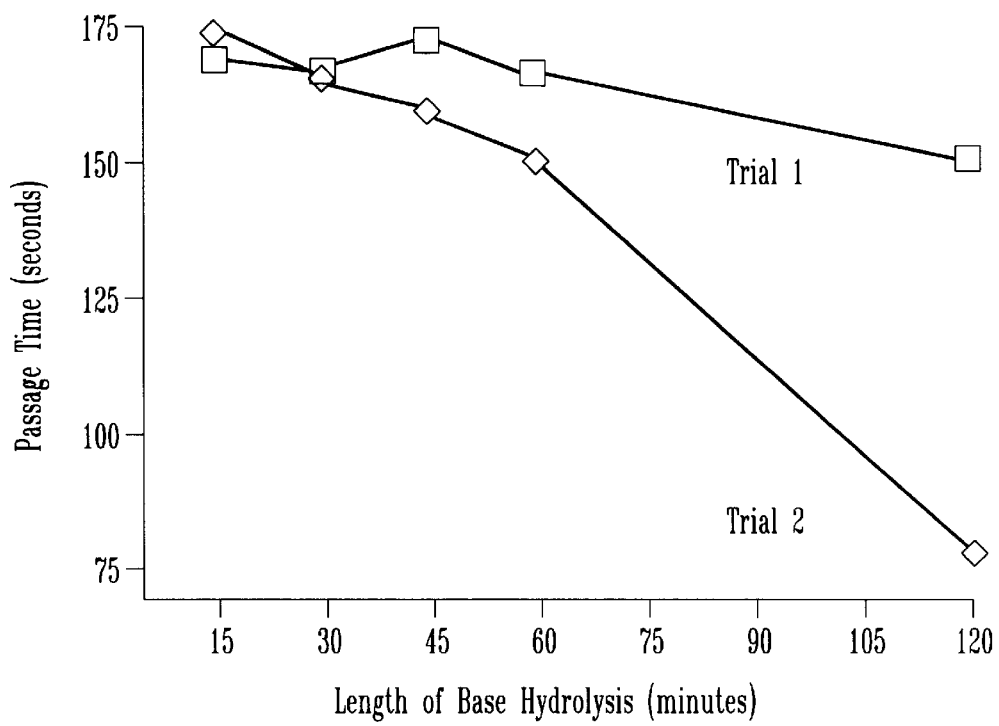
FIG. 3. The effect of incremental additions of NaOH versus bulk (1-time) addition of NaOH during alkaline hydrolysis of polyaspartimide on the viscosity MW of resulting polyaspartates.
Figure 4:
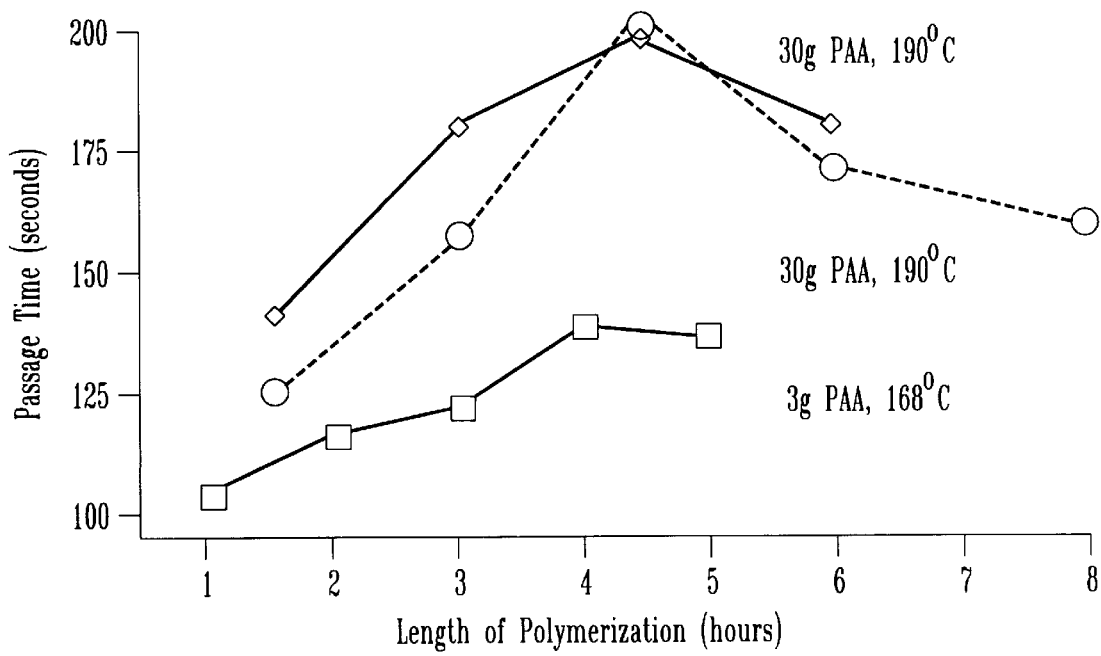
FIG. 4. The effect of duration of reaction on the viscosity MW of polyaspartates produced at different temperatures in the presence of polyphosphoric acid as in example 2.

Stock solutions of samples for MW assessment by viscometry were prepared by weighing 0.40 g of polyaspartimide into a 20 ml scintillation vial. To this, 10 ml of water were added to form a slurry. The vial was placed on a magnetic stir plate with smooth stirring, and a pH electrode was set up in the slurry. By use of droplets of 10N NaOH, the pH was ~10 at 80° C. for 1 hour. Addition of droplets of NaOH at intervals, with monitoring of pH during conversion to polyaspartate was shown to protect the molecules from hydrolyzing to smaller polymers. A decrease in molecular size was observed by viscosity analysis when the NaOH was added in one aliquot at the beginning of the alkaline treatment (FIG. 3) and if the polymerization was extended past an optimal time (FIG. 4).

At the end of the mild alkaline hydrolysis, the stock solution was neutralized with 1N HCl and the total volume adjusted to 20 ml to yield a 2 percent by weight (as polyaspartimide) solution. This solution was used for the viscometry, including preparation of dilutions for samples of lower concentration. Solvent blanks of water with salinity equivalent to that of the samples showed that the viscosity of water and the dilute saline solutions were the same. In general, distilled water was used for the control values of viscosity.

Four ml of samples were pipetted into the viscometer (Cannon 75 L197). The viscometer was partially submersed in a circulating water bath thermostated at 25° C. The solution in the viscometer was allowed to equilibrate for 10 minutes. Next, the solution was drawn into the capillary of the viscometer with a pipetting bulb and allowed to pass back through the capillary. After this initial passage, which coated the capillary with the sample fluid, the procedure was repeated at least 4 times and the passage times recorded. The passage time for control solvents was about 130 seconds, depending on the particular viscometer used. Densities of sample fluids and solvents were measured by weighing specific volumes, including fluids when they were in the viscometer.

Figure 5:
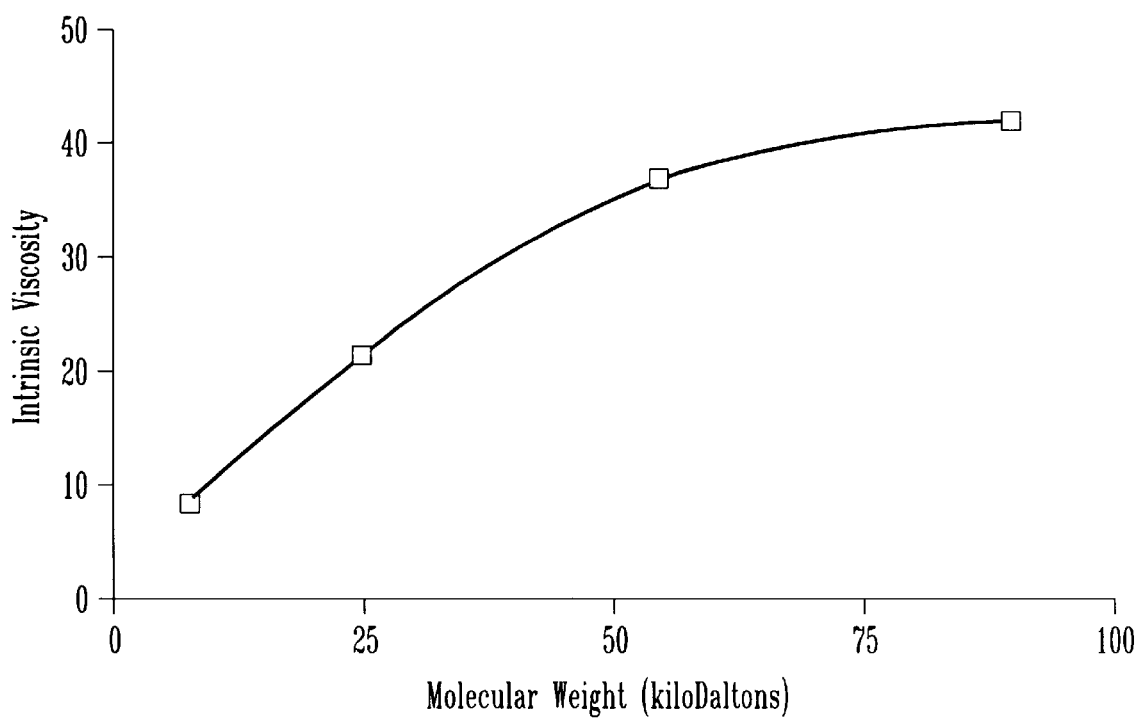
FIG. 5. Standard curve of intrinsic viscosities of polyaspartates and polyglutamates versus molecular weights.
Figure 6:
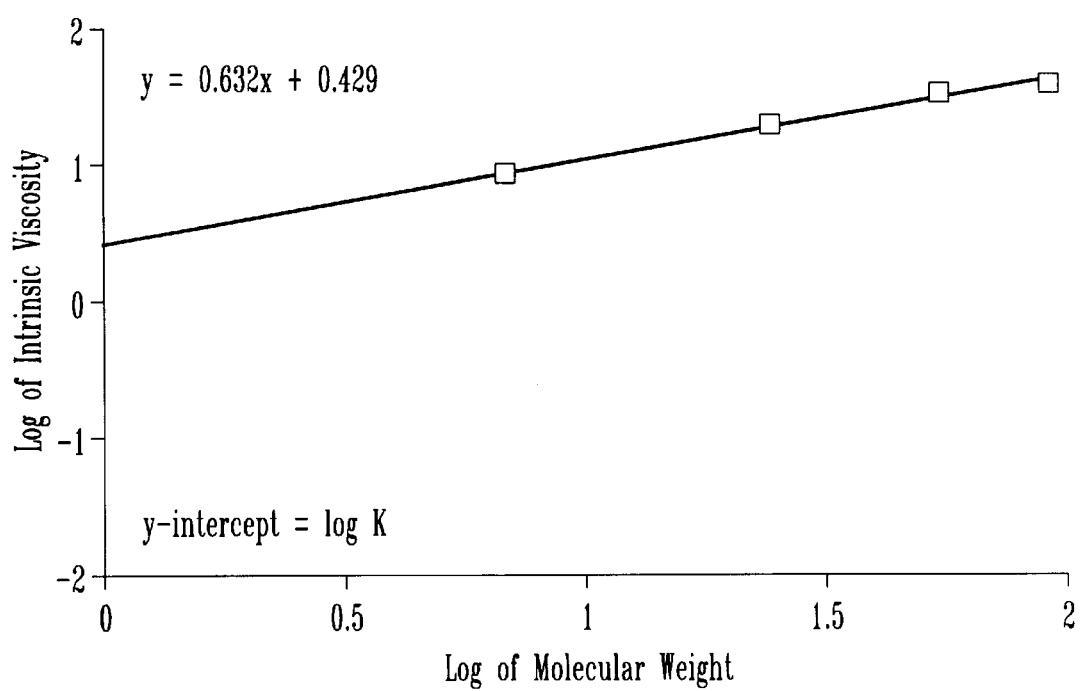
FIG. 6. Log of intrinsic viscosity versus log molecular weight of polyaspartate and polyglutamate standards. Equation of the line: y=0.632x+0.429.
Figure 7:
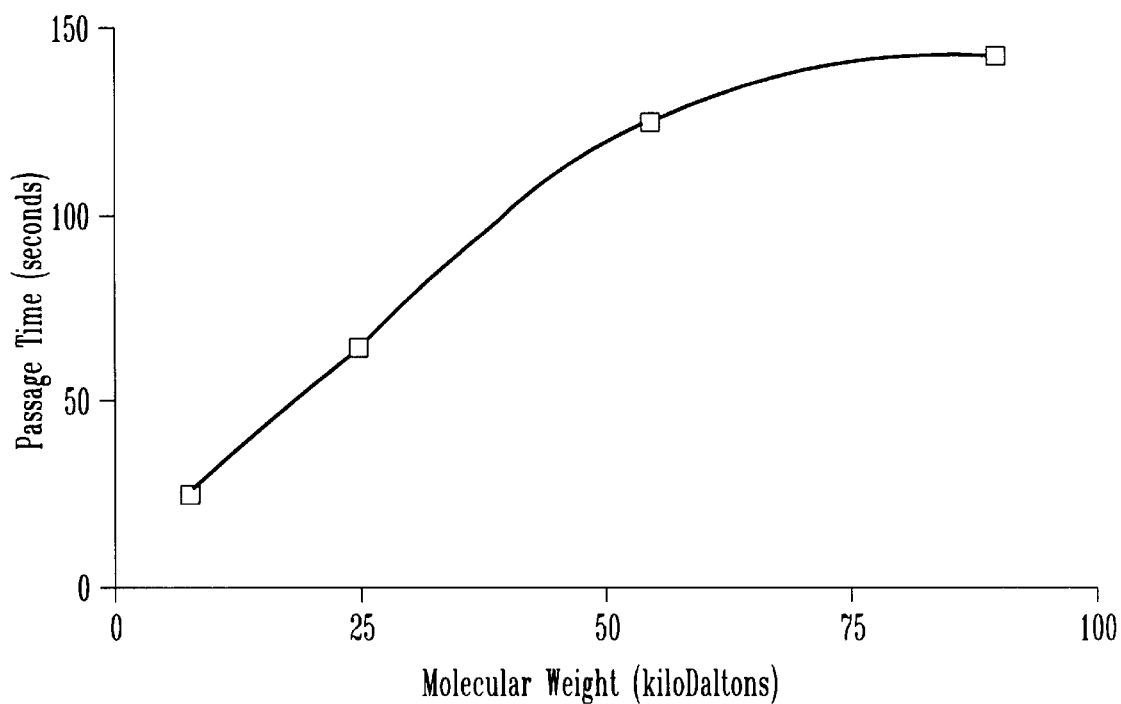
FIG. 7. Viscometer passage times of 2 percent by weight solutions of polyaspartate and polyglutamate standards in water versus molecular weight.
Figure 8:
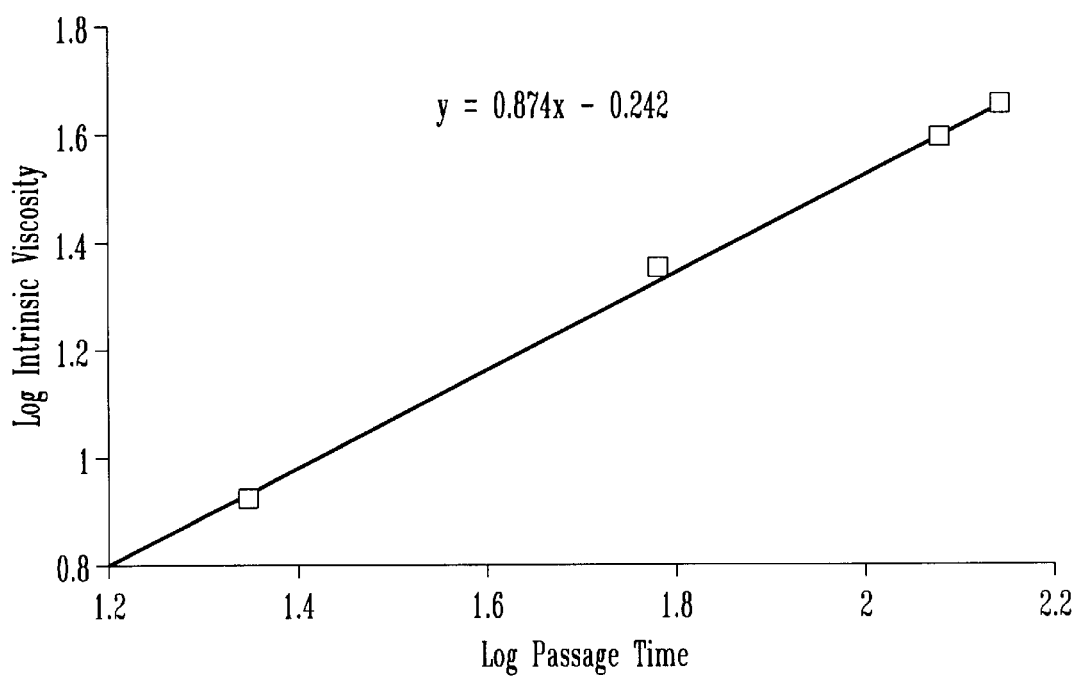
FIG. 8. Log of intrinsic viscosity versus log of viscometer passage times for 2 percent by weight solutions of polyaspartate and polyglutamate standards in water. Equation of the line: y=0.874x−0.242.

The MW of a sample was estimated by measuring viscosities at different concentrations, and deriving a value for intrinsic viscosity using this value to calculate MW from a standard curve (FIGS. 5, 6). It was also possible to approximate the MW simply from the passage time of the 2 percent stock solutions (FIGS. 7, 8). Passage times reported have been corrected for the passage times of solvent controls.

Gel Permeation

Figure 9:
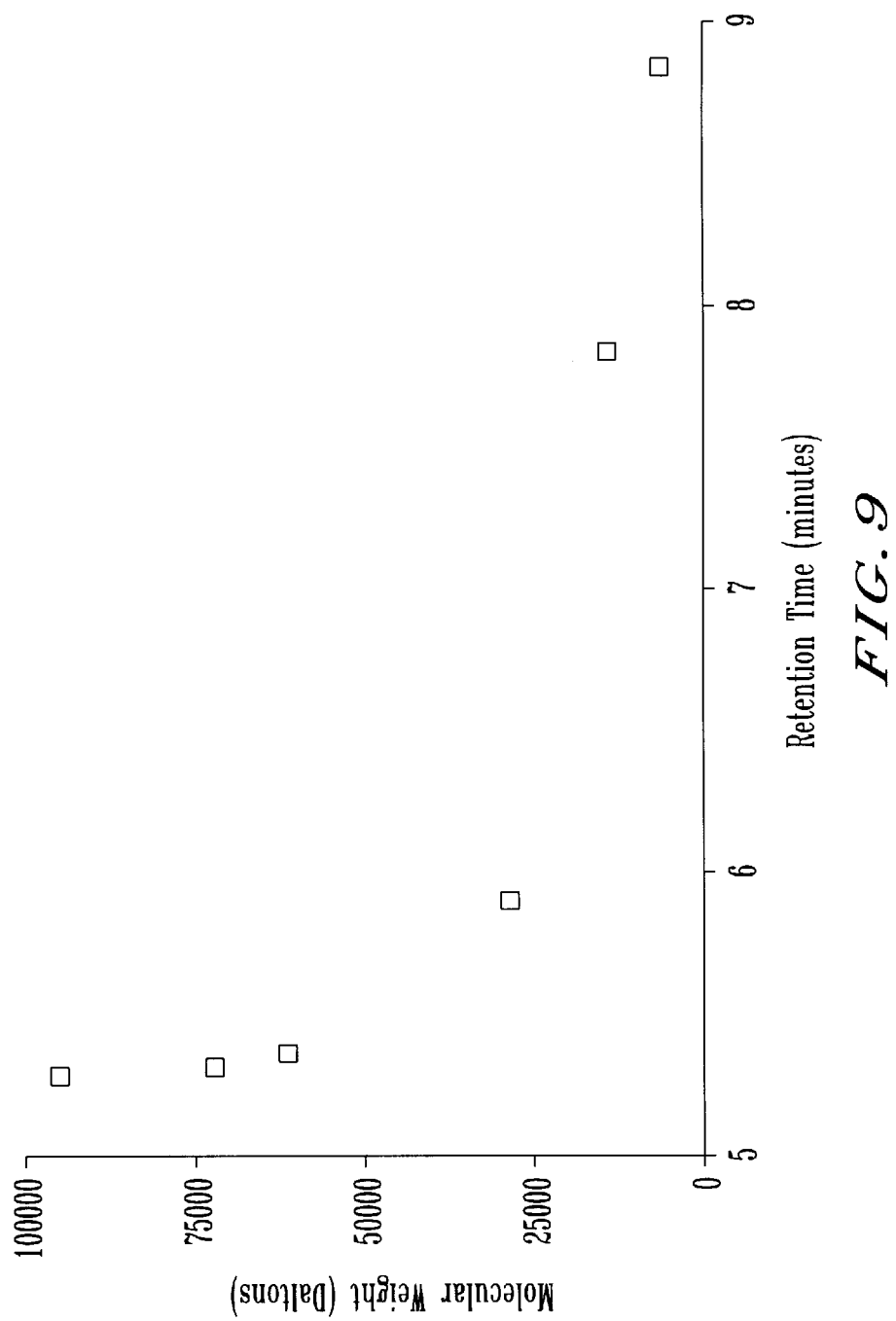
FIG. 9. Gel-permeation standard curve of molecular weight of polyaspartate and polyglutamate standards versus retention time.
Figure 10:
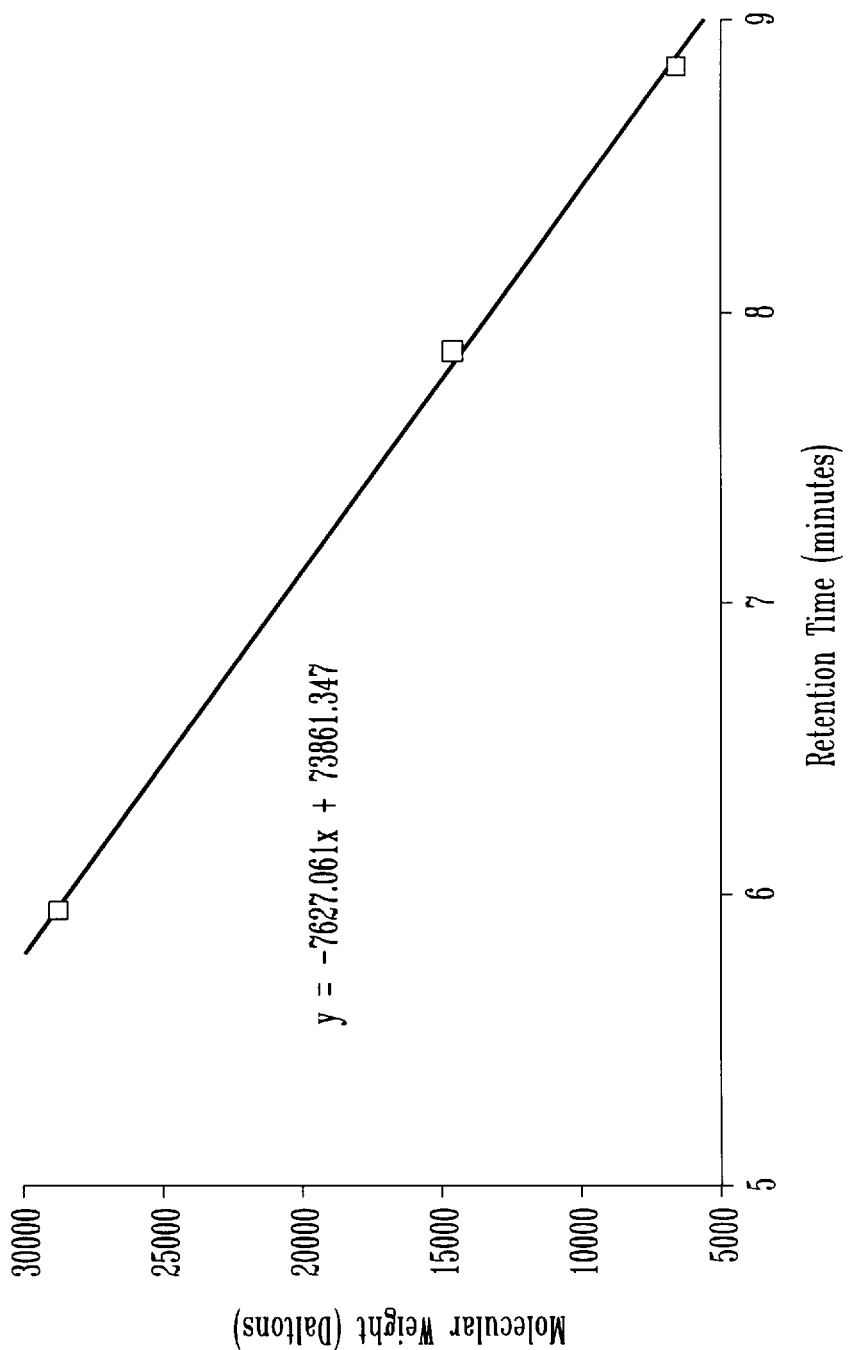
FIG. 10. Linearity of a gel-permeation standard curve of molecular weight of polyaspartate standards versus retention time. Equation of the line: y=−7627x+73861.

Molecular weights of samples were also determined by gel permeation liquid chromatography (Varian 5500 LC; Toya Soda column, G3000 SW). Commercial polyaspartates ranging from 6000 to 31,000 and polyglutamates from 48,000 to 98,000 daltons were used as standards (Sigma Chemical). Stock solutions of 1 mg/ml were prepared. Injection volume was 100 $\mu$l: mobile phase=0.01M Tris, 0.1M NaCl in water, pH 8.0; flow=1.0 ml/min, detection= UV at 235 mm. Standard curves are shown in FIGS. 9 and 10.

Laser Light Scattering

Molecular weights of selected samples were determined by multi-angle laser light scattering as described by Wyatt (1993), using a mini-Dawn detector and the LC system described above.

A comparison of MW assessments by different analytical methods of four samples of polyaspartate is shown in Table 2.

Gel Volume

The method relies on the exclusion of blue dextran (BD, MW-2 million daltons, Sigma Chemical) from AGM's during absorption of water. The extent to which the excluded, non-absorbed water becomes enriched in BD in the presence of an AGM is an indication of the amount of absorbed water. The concentration of BD is assessed spectrophotometrically at 617 nm.

Assays consisted of weighing 0.100 g of AGM into each of two 50 ml beakers. To one, 20 ml of synthetic urine (6.0 g NaCl, 0.18 g $CaCl_2 \cdot 2H_2O$, 0.36 g $MgCl_2 \cdot 6H_2O$, 1.5 ml of 1 percent aqueous Triton-X, 600 ml water) were added; and to the other, 20 ml of synthetic urine containing 0.03 percent wt/volume of BD.

This resulted in a slurry of AGM which was gently stirred magnetically for 1 h, the slurry allowed to settle, and the supernatant collected. The supernatant was centrifuged for 15 minutes at 850×g in a table-top centrifuge at room temperature. The absorbance (A) of the supernatant was then read at 617 nm with the synthetic-urine treatment as reference, and gel volume (GV) calculated as below.

$$GV = \frac{g \text{ of } BD \text{ solution}}{g \text{ of } AGM} \times \left[ 1 - \frac{ABD \text{ solution}}{ABD \text{ supernat} - A \text{ synthetic urine supernat}} \right]$$

One problem that occurred with this assay involved the AGM's that had been precipitated and washed in 0.01N HCl, and then lyophilized. This produced an AGM in an acid form that must be neutralized prior to the BD assay for gel volume.

Figure 11:
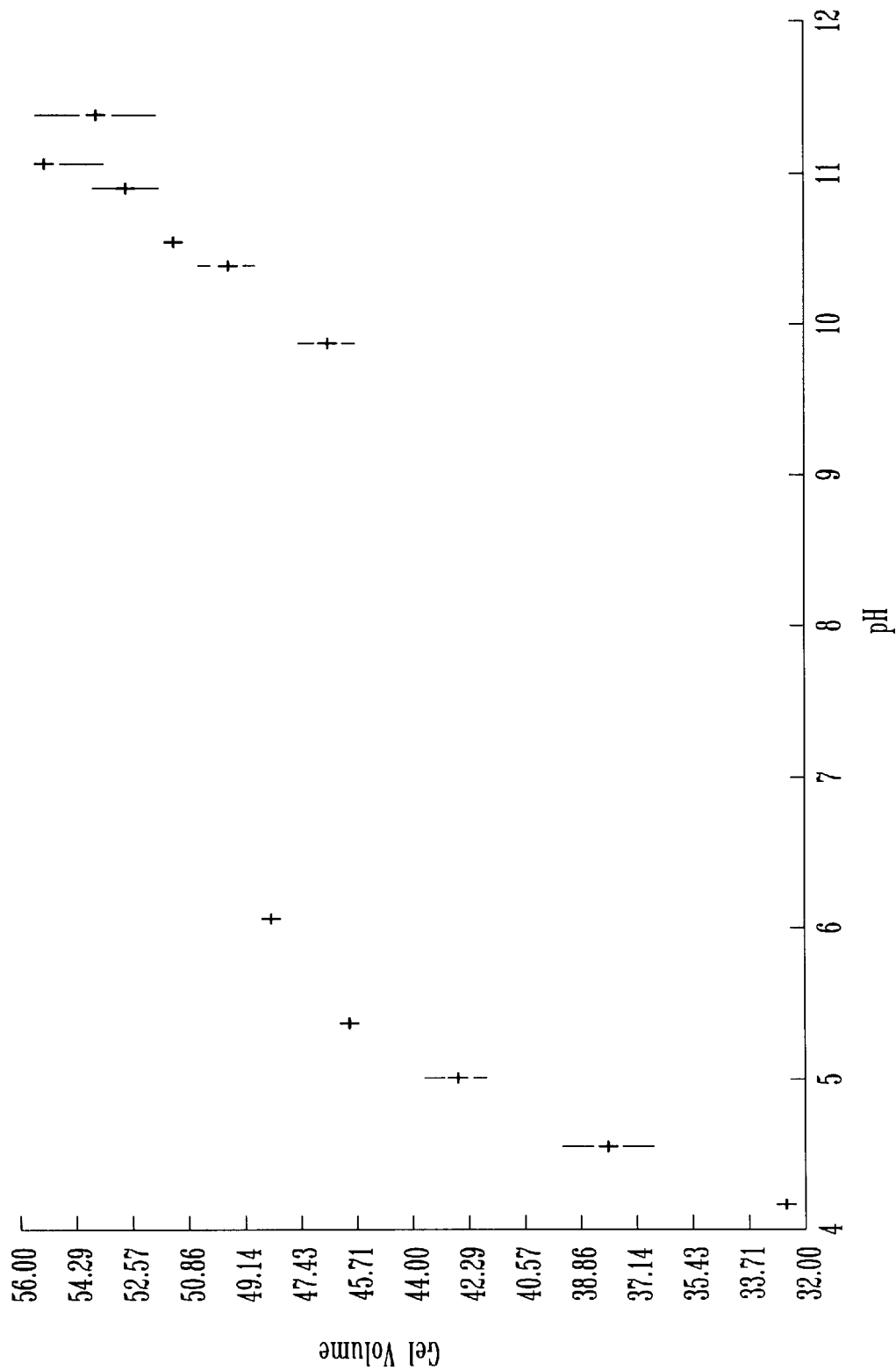
FIG. 11. The effect of pH on the blue-dextran gel volume (saline) of the polyamino acid AGM prepared as in example 15.

As shown in FIG. 11, the BD gel volume is a function of pH. Below pH 4, the AGM's lose their polyanionic character and do not absorb water. In the range of pH 6 to 10, the gel volume is stable and this is the gel volume reported herein. Above pH 10, the BD gel volume may increase somewhat.

To accommodate this property of the acid-washed AGM'S, up to 70 $\mu$l of 10N NaOH was added to the samples after the addition of the synthetic urine. The exact amount of NaOH to be added for a particular AGM was determined experimentally by titrating samples of the AGM. The pH of the slurry of AGM in synthetic urine was routinely checked to insure an optimal assessment of BD gel volume.

Another problem that is encountered sometimes in BD gel-volume measurements, especially if the pH is either too low or too high, is that the BD may bind to the gel. This is readily observable in the form of a bluish gel, or a blue layer on top of the gel upon centrifugation. In severe cases, due to removal of the BD from the supernatant, "negative" gel volumes may be calculated for materials that are actually quite effective gelling materials.

Gel Weight

One approach to this type of problem, which also is an often-reported method of indicating the absorption of water by a material, is to allow a weighed sample of dry AGM to swell in water, decant the supernatant (with or without centrifugation), and to reweigh the sample. The weight after swelling minus the weight before swelling presumably is equal to the amount of water absorbed.

Figure 12:
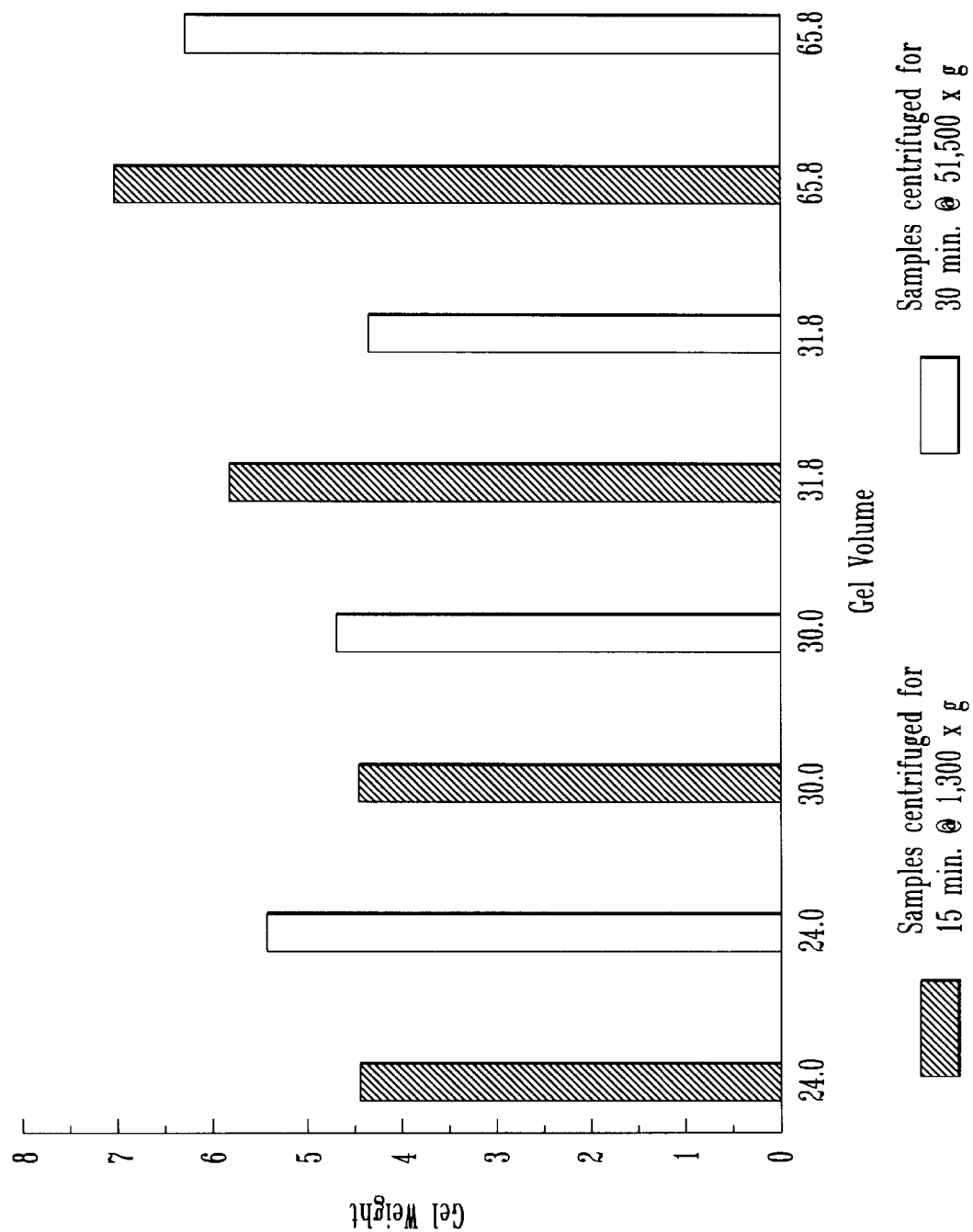
FIG. 12. A comparison of gel weight and gel volume for selected AGM's that were subjected to different centrifugal forces prior to measurement of gel weight.

This approach, a type of gel-weight assay, does avoid problems associated with use of dyes. However, as shown in FIG. 12, the correspondence of gel weight and BD gel volume is poor, even for samples that do not exhibit dye binding. In some cases, there may be interstitial water between gel particles, that contributes to gel weight but not gel volume. In other cases, there may be loosely held water that is lost on compaction of the gel during centrifugation. Consequently, gel weight measurements may either overestimate or underestimate gel volumes, often by large amounts.

Gel height (fast gel volume)

Based on extensive experience with polyaspartate AGM's of the present invention, a simpler, faster assay was developed for screening gel volumes of AGM's. If the samples are uniform and consistent in their swelling and settling properties, it is possible to obtain an accurate estimate of gel volume simply by observing the gels in test tubes. The method is best calibrated against the blue-dextran assay. However, in cases in which the blue dextran assay fails due to dye binding, as in AGM's with cationic groups, the gel height method yields the better measurement. The examples of the present invention listed in Table 3 exhibited good agreement between BD gel volumes and fast gel volumes.

Procedures

1. A sample of 0.100 g of AGM was placed in a test tube (e.g., glass test tubes of 10 cm×1.5 cm).
2. To this, 5 ml of synthetic urine was added. If gel volumes were much greater than 30, 5 ml more of synthetic urine was added.
3. The test tube was vortexed for a few seconds until the AGM was thoroughly mixed with the fluid.
4. The AGM was allowed to settle for 10 minutes, or until a clear and stable separation between the gel and fluid was visible.
5. The height of the gel was measured using a mm ruler.
6. This height was compared to that of a standard material of known gel volume. The GV was calculated as a proportion:

GV sample=[(height of sample)/(height of standard)](GV of standard).

This method yielded gel volumes for polyacrylate AGM's and polyaspartate AGM's, for samples without dye binding, that were comparable to blue-dextran gel volumes for these materials.

Gel Strenqth

This property of gels was measured as the shear modulus, which is an indication of the extent to which a gel will resist deformation in response to an applied force. A pulse shearometer (Pen Kem, Inc.) was used to determine shear modulus. In this technique, a wave is pulsed through a gel and the velocity of the propagation of the wave through the gel is measured by recording the time for the pulse to be received at a piezoelectric transducer.

Prior to measuring gel strength, the BD gel volume of a sample was measured. For example, to determine the gel strength of a sample with a BD gel volume (saline) of 30, the sample was first swollen to its BD gel volume by adding synthetic urine in the amount of 30 times the dry sample weight. Alternatively, the gel can be formed in an excess of synthetic urine and then allowed to drain for 10 minutes onto absorbent paper to remove non-absorbed saline prior to measurement of gel strength. Samples treated by either method yielded comparable values of gel strength.

Figure 13:
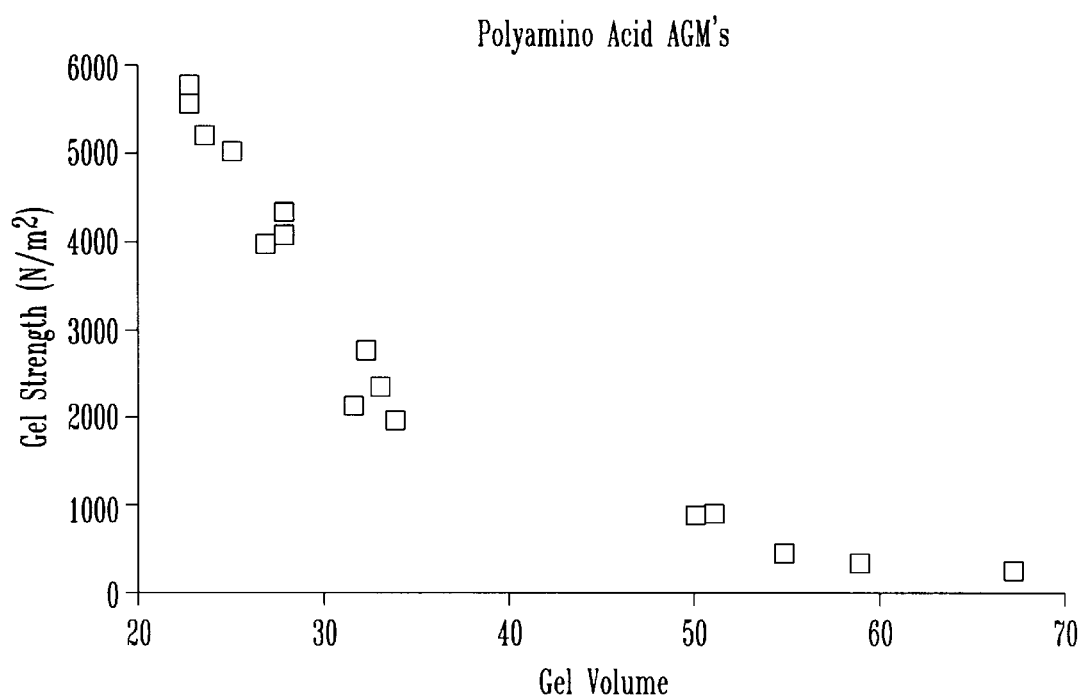
FIG. 13. The relationship between gel strength and gel volume for selected AGM's.
Figure 14:
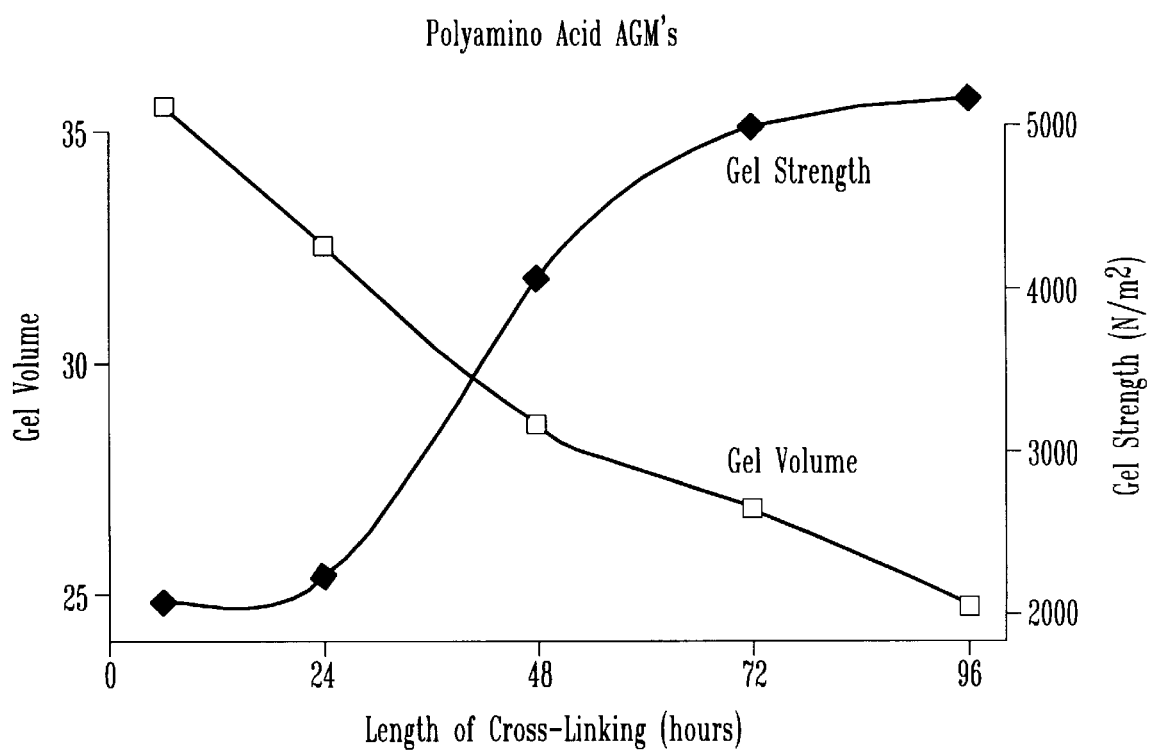
FIG. 14. The relationship between gel volume, gel strength, and time of the cross-linking reaction for selected AGM's.

Following preparation of the swollen AGM, a tapered 50-ml graduate cylinder was filled and 50 ml of the gel was weighed to determine gel density. The gel was then poured into the measuring unit of the pulse shearometer, care taken to gently tamp the gel around the transducer plates to remove air spaces. Wave propagation was measured through the gel over the distances of 10 to 5 mm in intervals of 0.5 mm. From this data, the average velocity of wave propagation and the shear modulus were calculated. In FIG. 13, the relationship between BD gel volume and shear modulus for a variety of polyamino acid AGM'S is shown. The influence of time and degree of crosslinking on both gel volume and gel strength for selected AGM's is shown in FIG. 14.

Amino Acid Analysis

AGM's were dissolved in 6N HCl with heating to make a solution of 1 mg AGM/ml. Alternatively, the AGM's were treated above pH 12 at 95° C. until solubilized. A sample of 10 ml of the stock solution was hydrolyzed in the presence of HCl vapor in vacuo at 150° C. for 1 hour using an amino acid workstation (Waters). Following hydrolysis, the residues were derivatized at the amine group by use of phenylisothiocyanate (PITC) by the PICOTAG protocol (Waters) and determined with a sensitivity of about 10 picomoles using an acetonitrile gradient and reverse phase liquid chromatography with UV detection at 254 nm.

Analysis of Diamine Crosslinkers

The diamines used as crosslinkers were also subject to PITC derivitization. However, following derivitization, they coeluted with large reagent peaks of the PICOTAG method.

The diamines instead were detected by derivitization with dansyl chloride according to the method of Watts et al. (1987). The AGM stock solution was prepared as above. Following derivitization, the diamines were detected by use of an acetonitrile gradient and reverse phase liquid chromatography with UV detection at 360 nm and a sensitivity of about 10 nanomoles. Aspartic acid also can be measured by this method.

Measurement of Free Amines

For AGM's prepared by chemical crosslinking or by nucleophilic addition, all of the crosslinker was routinely incorporated into the AGM. To determine to what extent the crosslinker molecules were actually attached on both sides of the molecule to the polyaspartate chains, the amount of free amine was measured in the AGM's as an indication of the amount of diamine incorporation by one amine group only. The ninhydrin reaction was used (Virender et al., 1981).

A sample of 2.5 to 3.0 mg of the AGM was weighed into a test tube. To this, 5 $\mu$l of 1N HCl were added, followed by 75 $\mu$l of 76 percent phenol in ethanol (weight/weight), 100 $\mu$l of 0.2 mM potassium cyanide in pyridine, and 75 $\mu$l of 0.28 M ninhydrin in ethanol. For AGM's that were precipitated and washed with 0.01N HCl it was not necessary to add the 5 $\mu$l of HCl, the purpose of which is to increase significantly the sensitivity of the assay. The assay worked for both soluble and insoluble samples because the ninhydrin color reagent interacts with either equally well.

Next the test tubes were incubated by use of a heating block at 100° C. for 7 minutes, then immediately brought up to a volume of 5 $\mu$l with 60 percent ethanol in water. The tubes were then vortexed, centrifuged at 500×g for 5 minutes, and the supernatant assessed spectrophotometrically at 570 nm. Although the amount of free amine in the sample can be calculated using a generalized molar absorptivity of 15,000 $M^{-1}cm^{-1}$ (Virender et al., 1981), it was found that light absorption by specific diamines departed significantly from this behavior. Therefore, standard curves using known amounts of various diamines were prepared and used to quantify the results (Table 4).

Extractable Materials

One hundred mg each of AGM's selected from samples prepared as in examples 9–17 were suspended in 200 ml of water to which 65 $\mu$l of 10N NaOH were added to insure swelling of the gel particles. This mixture was stirred for up to 24 hours, with sampling at various intervals. Subsequent analysis showed that extraction was essentially complete after 1 hour, and that the AGM's did not dissolve over time under these conditions.

To take a sample of the mixture, stirring was stopped, the gel was allowed to settle, and 1 ml of the supernatant was pipetted into a microcentrifuge tube. This was centrifuged at 14,000 rpm in a table-top microfuge (Eppendorf model 5415). This supernatant was used for assessment of soluble amino acids and diamines as discussed above.

There were no detectable amounts of other components that were used in various syntheses, including phosphate (spectrophotometric analysis), DCC/DCU (infrared spectra of lyophilized powders), or solvents (UV spectra).

Charge Density

Figure 15:
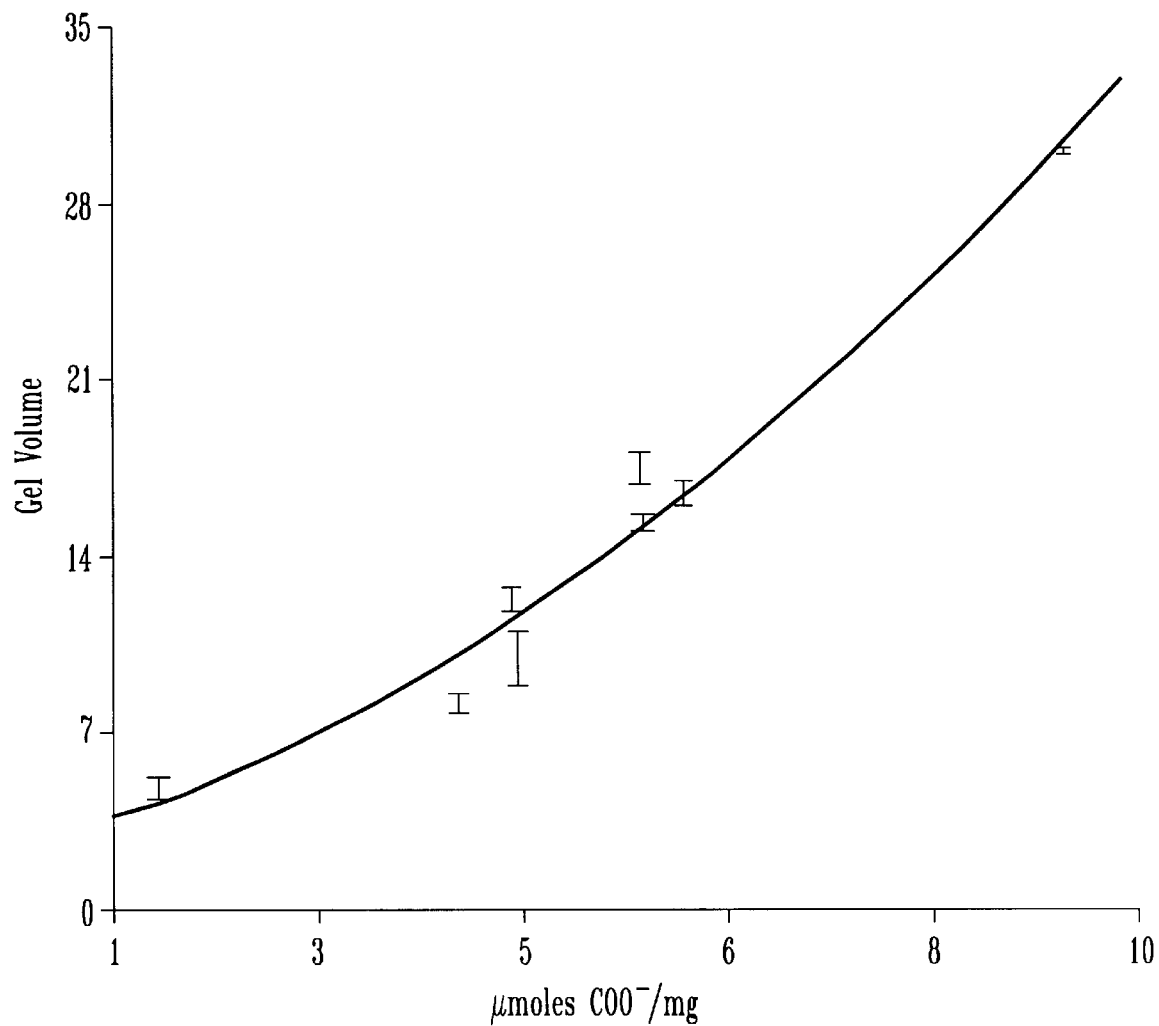
FIG. 15. The relationship between charge density and gel volume for selected AGM's.
Figure 16:
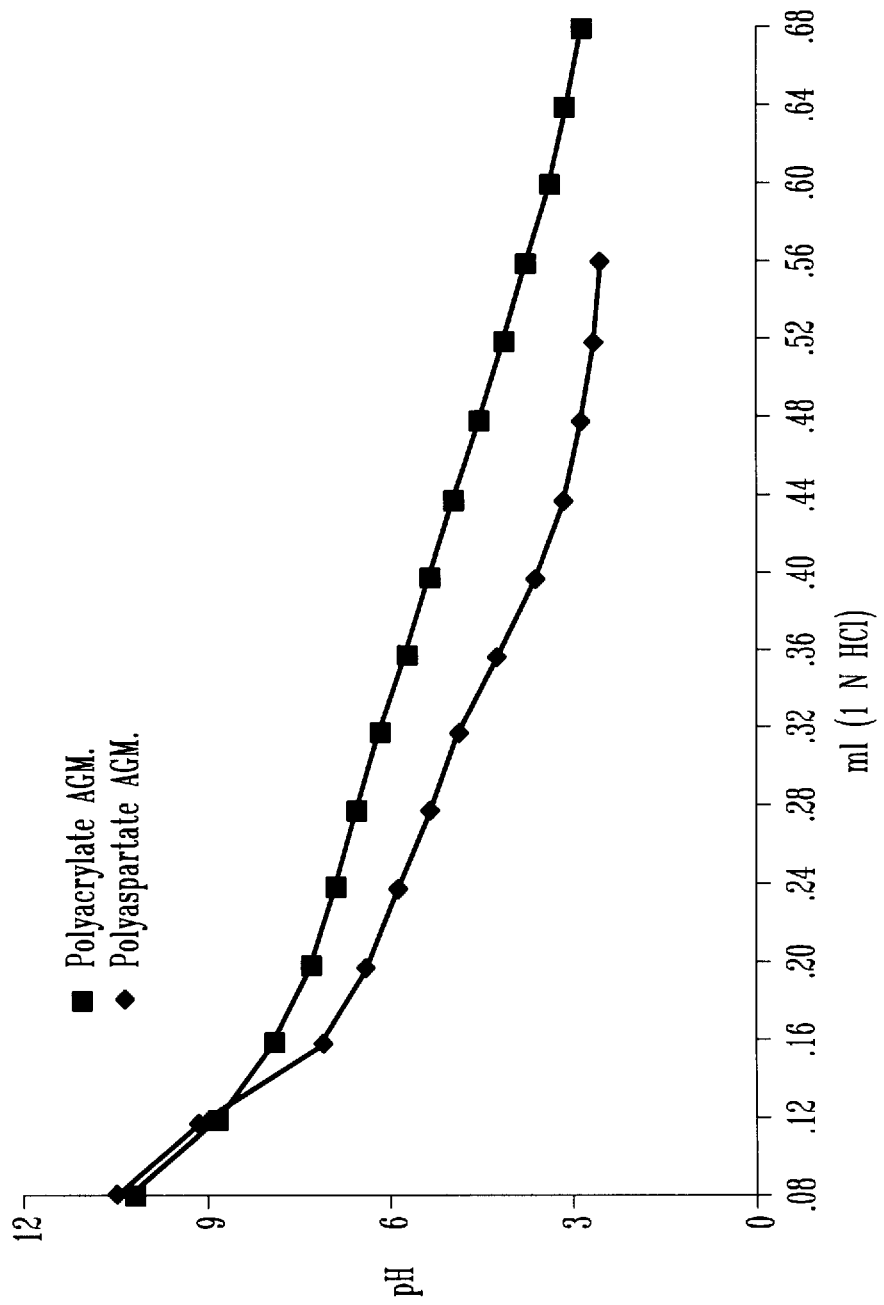
FIG. 16. Representative titration curves for determination of charge density.

This parameter was useful not only for characterizing an AGM, but also for predicting gelling behavior in some cases. Volumes of charge density for a particular class of AGM's fall within a definable range. For example, as shown in FIG. 15, the AGM's of low molecular weight polyaspartate that were crosslinked by thermal treatment with lysine (Donachy and Sikes, op. cit.) had saline gel volumes less than 18 and charge densities less than 6$\mu$moles $COO^-$/mg. On the other hand, the AGM's of the current invention (Table 3) had AGM's greater than 20 and charge densities that ranged from 6.67 to 7.59 $COO^-$/mg. Typically, a sample of 58 mg (0.5 mole per residue as $Asp_n$) is suspended in 50 ml of water. The pH was adjusted to 11.3 with 1N NaOH, and after 15 minutes to allow equilibration with the solution, the gelling material was titrated to pH 3.0 with 0.1N HCl. The titration was done automatically (Fisher Scientific, computer aided titrimeter) with endpoints selected at 9.5 and 3.0. The titration curves (FIG. 16) are relatively featureless over this range, which is sufficient to account for all of the ionizable $COO^-$ groups while excluding $NH_3^+$ groups. Comparisons of theoretical and experimentally titrated values for charge densities are shown in Table (4).

Charge density was also determined for polyaspartimide and polyaspartate as a way of determining the extent of hydrolysis of imide rings. Some titratable groups were detected for polyaspartimide, indicating that up to 10 percent of the residues were in the COOH form following thermal polycondensation of aspartic acid.

Sodium Analysis

The $Na^+$ content of the AGM's must be optimized so that the preferred gelling properties and particle sizes of the materials were produced. The $Na^+$ content was measured as follows.

1. 50 mg of an AGM were placed in 25 ml of distilled water in a 50 ml beaker.
2. This was titrated to pH 2 with 1.0N HCl to release $Na^+$.
3. A sample of 30 $\mu$l of this was diluted to 3 ml with distilled water in a test tube (for an AGM of 10 percent $Na^+$ by weight, this gave a solution in the test tube of 2 $\mu$g $Na^+$/ml). For comparison, other volumes in the range of 15 to 60 $\mu$l were also analyzed.
4. Standards of 0 to 5 $\mu$g/ml were prepared and measured by flame emission at 589 nm (Perkin Elmer, model 460, atomic absorption spectrophotometer).
5. Samples were also measured as above. Representative results of $Na^+$ analysis are shown in Table 5.

Infrared spectra

Figure 17:
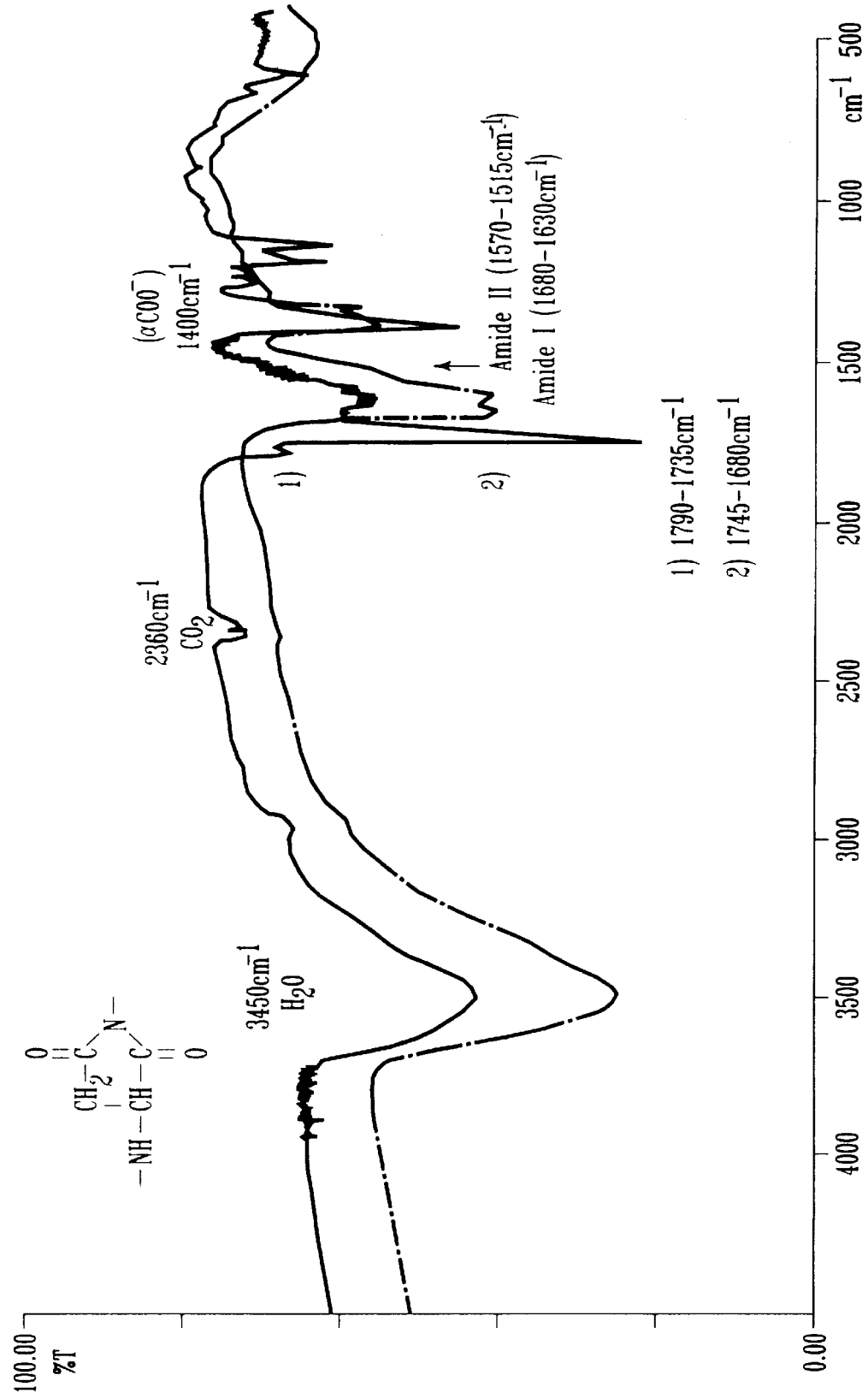
FIG. 17. Infrared spectra of polyaspartimide prepared by thermal polycondensation and polyspartate prepared by mild alkaline hydrolysis of the polyaspartimide.

The relative amounts of aspartate and aspartamide residues in the polymers and the AGM's were detected from the characteristic infrared peaks. For example, polyaspartate had peaks in the range 1680–1630 $cm^{-1}$ (amide I) and 1570–1515 $cm^{-1}$ (amide II) (FIG. 17, lower curve). Polyaspartimide had a peak in the range 1745–1680 $cm^{-1}$ (imide ring) (FIG. 17, upper curve).

Spectra were prepared from pellets of the dried, purified powders prepared in dried, analytical KBr. An infrared spectrophotometer (Perkin Elmer, model 1600 FTIR) was used.

LIST OF TABLES

Table 1. Representative results of thermal condensation synthesis of polyaspartates of differing molecular weights under various reaction conditions.

Table 2. Estimate by three methods of molecular weights of selected polyaspartate molecules.

Table 3. Gel volumes, gel strengths, and charge densities of selected AGM's.

Table 4. Amount of free amine groups in selected AGM's based on ninhydrin analysis.

Table 5. Charge densities of molecules used in AGM's as determined by titration of COO$^-$ groups (n=3, ±S.D.).

Table 6. Sodium content of selected polyaspartate AGM's.

Obviously, numerous modifications and variations of the present invention are possible in light of the above teachings. It is therefore to be understood that, within the scope of the appended claims, the invention may be practiced otherwise than as specifically described herein.

REFERENCES

Anonymous. 1993. Biopolymers: Making Materials Nature's Way. U.S. Congress, Office of Technology Assessment. Background Paper. OTA-BP-E102, 80 p.

Barbier, A., J. Millan, M. Sabadie. 1993. Cosmetic composition containing amino acid copolymers which is useful as a moisturizer. U.S. Pat. No. 5,204,099.

Boehmke, G. 1989. Polyaspartic acid from maleic acid and ammonia. U.S. Pat. No. 4,839,461.

Bortnick, N. M., R. E. Jerman, J. M. Lipovsky, Y. H. Paik, E. S. Simon, and G. Swift. 1995. Continuous thermal polycondensation process for preparing polypeptide polymer. U.S. Pat. No. 5,410,017.

Brandt, K. A., S. A. Goldman, T. A. Inglin. 1988. Hydrogel-forming polymer compositions for use in absorbent structures. U.S. Pat. Re. 32,649.

Bric, J. R., S. Kesavan, and R. K. Prud'homme. 1983. Rheology of reactive gel slurries. Proceedings of ACS Division of Polymeric Materials, Science, and Engineering 61, 403–405.

Buchholz, F. L. and N. A. Peppas. 1994. Superabsorbent Polymers: Science and Technology. ACS Books, Washington, D.C. 148 p.

Calton, G. J. and L. L. Wood. 1994. Copolymers of polyaspartic acid. U.S. Pat. No. 5,357,004.

Donachy, J. and Steven Sikes. 1993. Polyamino acid superabsorbents. U.S. Pat. No. 5,247,068.

Donachy, J. and C. Steven Sikes. 1994. Polyamino acid superabsorbents CIP. U.S. Pat. No. 5,284,936.

Fox, S. W. and K. Harada. 1960. Thermal copolymerization of amino acids in the presence of phosphoric acid. Archives of Biochemistry and Biophysics 86, 281–285.

Fox, S. W. and K. Harada. 1966. Thermal polycondensation of a-amino acids. In, A Laboratory Manual of Analytical Methods of Protein Chemistry, Including Polypeptides. Volume 4. P. Alexander and H. P. Lundgren (eds.). Pergamon Press. Oxford. 127–151.

Freeman, M. B., Y. H. Paik, G. Swift, S. K. Wolk, K. M. Yocom. 1994. Biodegradable poly(aspartic acid) detergent polymers. American Chemical Society 207th National Meeting, Abstract.

Fujimoto, Y. and M. Teranishi. 1974. Polyamino acid derivatives and compositions containing same. U.S. Pat. No. 3,846,380.

Fujimoto, Y. and M. Teranishi. 1975. Polyaspartic acid derivatives having surface-active properties. Convention Patent 1,404,814.

Furia, T. 1980. Food Additives. In, Encyclopedia of Chemical Technology, Vol. 11, M. Grayson and D. Eckroth (eds.). Wiley and Sons, New York 146–163.

Gross, J. R. and R. S. Harland. 1992. Osmotically enhanced absorbent structures. U.S. Pat. No. 5,082,723.

Harada, K. 1959. Thermal homopolymerization of lysine and copolymerization with neutral and acidic amino acids. Bulletin of the Chemical Society of Japan 32, 1008.

Harada, K. and S. W. Fox. 1965. Thermal polycondensation of free amino acids with polyphosphoric acid. In, The Origins of Prebiological Systems and of their Molecular Matrices, S. W. Fox (ed.). Academic Press, NY.289–298.

Hayashi, I., T. Itikawa, K. Ogihara, and K. Shimizu. 1985. Process for producing sequential polyamino acid resin. U.S. Pat. No. 4,525,576.

Hayashi, I., T. Itakawa, and K. Shimizu. 1986. Producing sequential polyamino acid resin. U.S. Pat. No. 4,594,409.

Holland, S. I. and B. J. Tighe. 1992. Biodegradable Polymers. In, Advances in Pharmaceutical Sciences, D. Ganderton and T. Jones (eds.). Academic Press, Volume 6. London. 101–164.

Holy, N. L., N. M. Bortnick, G. Swift, and K. A. Hughes. 1995. High temperature aqueous polymerization process. U.S. Pat. No. 5,412,026.

Hozumi, Y., T. Inaoka, T. Gomi, T. Goto, T. Uno, and K. Rakutani. 1994. Oil-absorbent polymer and use thereof. U.S. Pat. No. 5,374,600.

Kalota, D. J. and D. A. Martin. 1994. Preparation of polysuccinimide. U.S. Pat. No. 5,329,020.

Kamath, K. R. and K. Park. 1993. Biodegradable hydrogels in drug delivery. Advanced Drug Delivery Reviews 11, 59–84.

Kellenberger, S. R. 1992. Absorbent products containing hydrogels with ability to swell against pressure. U.S. Pat. No. 5,147,343.

Kesavan, S. and R. K. Prud'homme. 1992. Rheology of guar and HPG cross-linked by borate. Macromolecules 25, 2026–2032.

Knebel, J. and K. Lehmann. 1992. Method of increasing the molecular weight in the manufacture of polysuccinimide. U.S. Pat. No. 5,142,062.

Kobayashi, T., S. Obuchi, H. Matsuno, M. Wada, H. Takayanagi. 1990. Production process of aromatic polyamide. U.S. Pat. No. 4,923,951.

Koskan, L. P. 1991. Process for the manufacture of anhydro polyamino acids and polyamino acids. U.S. Pat. No. 5,057,597.

Koskan, L. P., K. C. Low, A. R. Y. Meah, and A. M. Atencio. 1992. Polyaspartic acid as a calcium carbonate and a calcium phosphate inhibitor. U.S. Pat. No. 5,152,902.

Koskan, L. P. and A. R. Y. Meah. 1993. Production of high molecular weight polysuccinimide and high molecular weight polyaspartic acid from maleic anhydride and ammonia. U.S. Pat. No. 5,219,952.

Koskan, L. P., K. C. Low, A. R. Y. Meah, and A. M. Atencio. 1993. Manufacture of polyaspartic acids. U.S. Pat. No. 5,221,733.

Krone, V. and A. Walch. 1993. Biologically degradable polyamino dicarboxylic acid-co-anhydro amino dicarboxylic acid derivative. U.S. Pat. No. 5,229,469.

Kyogoku, N. and K. Harada. 1991. Process for producing novel gel-like food articles. U.S. Pat. No. 5,037,664.

Kyogoku, N. and K. Harada. 1992. Gelled emulsion and process for producing the same. U.S. Pat. No. 5,093,028.

Kyogoku, N. and K. Harada. 1992. Novel gel-like food articles and process for producing the same. U.S. Pat. No. 5,098,733.

Lehmann, K., R. Jelitte, and J. Knebel. 1992. Polymers derived from polysuccinimide, used as surface coatings for medicinals and foods. U.S. Pat. No. 5,175,285.

Levy, R. 1991. Terrestrial delivery compositions and methods for controlling insect and habit-associated pest populations in terrestrial environments. U.S. Pat. No. 4,983,390.

Nagatomo, A., H. Tamatani, M. Ajioka, and A. Yamaguchi. 1995. Superabsorbent polymer and process for producing the same. European Patent Application 0 658 586 A1.

Neri, G. A., F. Benvenuti, F. Cocola, and G. Gazzei. 1973. Synthesis of a,B-poly[2-hydroxyethyl)-DL-aspartamide), a new plasma expander. Journal of Medicinal Chemistry 16, 893–897.

Paik, Y. H., G. Swift, E. S. Simon, and M. B. Freeman. 1995. Production of polysuccinimide by thermal polymerization of fumaramic acid. U.S. Pat. No. 5,424,391.

Pen Kem, Inc. 1986. Rank Pulse Shearometer. Pen Kem, Inc., Benford Hills, N.Y.

Prud'homme, R. K., V. Constien, and S. Knoll. 1989. The effects of shear history on the rheology of hydroxypropyl guar gels. In, Polymers in Aqueous Media, M. Joan Comstock (ed.), ACS Advances in Chemistry 223, Washington, D.C. p. 89–112.

Sakata, T., H. Kenji, and Y. Mukoyama. 1991. Process for the production of high molecular weight polyamide-imide resin. U.S. Pat. No. 5,047,499.

Schiff, H. 1897. Ueber polyaspartsauren. Chemische Berichte 30, 2449–2459.

Schornick, G., M. Kroner, R. Lungershausen. 1994. Biodegradation of polyaspartate: effect of synthetic methods. American Chemical Society 207th National Meeting. Abstract.

Sikes, C. S. and A. P. Wheeler. 1985. Inhibition of inorganic or biological $CaCO_3$ deposition by polyamino acid derivatives. U.S. Pat. No. 4,534,881.

Sikes, C. S. and A. P. Wheeler. 1989. Inhibition of mineral deposition by polyanionic/hydrophobic peptides and derivatives thereof which have a clustered block copolymer structure. U.S. Pat. No. 4,868,287.

Sikes, C. S. 1991. Inhibition of mineral deposition by phosphorylated and related polyanionic peptides. U.S. Pat. No. 5,051,401.

Sikes, C. S. 1994. Polyamino acid dispersants. U.S. Pat. No. 5,328,690.

Sikes, C. S. and A. Wierzbicki. 1996. Polyamino acids as antiscalants, dispersants, antifreezes, and absorbent gelling materials. In Biomimetic Materials Chemistry, S. Mann (ed.). VCH Publishers, Inc., New York. p. 249–278.

Stokke, B. T., O. Smidsrod, A. B. L. Marthinsen, and A. Elgsaeter. 1987. Conformational analysis of xanthan and welan using electron microscopy. In, Water-Soluble Polymers for Petroleum Recovery, G. A. Stohl and D. N. Schulz (eds.). Plenum Press, New York. p. 243–252.

Ueno, Katsuji and K. Nagaoka. 1984. Process for producing aromatic polyamide-imide. U.S. Pat. No. 4,448,957.

Virender, S. K., S. Kent, J. P. Tam, and R. B. Merrifield. 1981. Quantitative monitoring of solid-phase peptide synthesis by the ninhydrin reaction. Analytical Biochemistry 117, 147–157.

Watts, S. A., K. J. Lee, G. A. Hines, and C. W. Walker. 1987. Determination of polyamines in digestive and reproductive tissues of adult *Asterias vulgaris* (Echinodermata: Asteroidea). Comparative Biochemistry and Physiology 88B, 309–312).

Williams, D. F. 1972. Cosmetics. In, Chemical Technology, an Encyclopedic Treatment, Volume V, Natural organic materials and related synthetic products, L. W. Codd, K. Dijkhoff, J. H. Fearon, C. J. van Oss, H. G. Roebersen, and E. G. Stanford (eds.). Barnes and Noble, New York. 817–853.

Wolk, S. K., G. Swift, Y. H. Paik, K. M. Yokom, R. L. Smith, and E. S. Simon. 1994. One- and Two-dimensional nuclear magnetic resonance characterization of poly (aspartic acid) prepared by thermal polymerization of L-aspartic acid. Macromolecules 27, 7613–7620.

Wood, L. L. 1994a. Preparation of salt of polyaspartic acid by high temperature reaction. U.S. Pat. No. 5,288,783.

Wood, L. L. 1994b. Method of production of copolymers of polyamino acids. U.S. Pat. No. 5,292,858.

Wood, L. L. 1994c. Salt of polymer from maleic acid, polyamine and ammonia. U.S. Pat. No. 5,286,810.

Wood, L. L. 1995. Polymers of maleic acid with amines. U.S. Pat. No. 5,442,038.

Wyatt, P. J. 1993. Light scattering and the absolute characterization of macromolecules. Analytica Chimica Acta 272, 1–40.

TABLE 1

Representative Results of Thermal Condensation Synthesis of Polyaspartates of Differing Molecular Weights under Various Reaction Conditions.

| Grams of Aspartic Acid | Temperature °C. | Time hours | Solvents and Catalysts | Molecular Weight (viscosity) |
|---|---|---|---|---|
| 10 | 240 | 4 | none | 5,000 |
|  |  | 6 |  | 5,000 |
|  |  | 8 |  | 5,000 |
|  |  | 24 |  | 5,000 |
| 10 | 240 | 4–24 | none, but with addition of monomer of Asp at each interval | 5,000 |
| 3.0 | 180 | 6 | 0.15 ml Pphos* | 47,000 |
|  |  | 24 |  | 33,500 |
| 3.0 | 190 | 1 | 0.30 ml Pphos | 30,000 |
|  |  | 3 |  | 52,500 |
|  |  | 6 |  | 90,500 |
|  |  | 12 |  | >120,000 |
|  |  | 24 |  | 95,000 |
| 30 | 190 | 3 | 4.50 ml Pphos | >120,000 |
|  |  | 4.5 |  | >120,000 |
|  |  | 6.0 |  | >120,000 |
|  |  | 12.0 |  | >120,000 |
|  |  | 24.0 |  | 100,000 |
| 40 | 190 | 4 to 24 | 50 ml Pphos | 26,000 to 61,000 |
| 20 | 220 | 6 to 20 | 10 ml $H_3PO_4$ | 1,200 to 7,000 |
| 10 | 150 to 175 | 2 to 24 | 1:1 molar ratio with $P_2O_5$ powder[b] | 18,000 to 40,000 |

TABLE 1-continued

Representative Results of Thermal Condensation Synthesis of Polyaspartates of Differing Molecular Weights under Various Reaction Conditions.

| Grams of Aspartic Acid | Temperature °C. | Time hours | Solvents and Catalysts | Molecular Weight (viscosity) |
|---|---|---|---|---|
| 30 | 190 | 4 to 24 | 4.5 ml $H_3PO_4$ | 20,000 to 60,000 |
| 3.0 | 170 | 1 to 5 | 0.45 ml Pphos | 30,000 to 50,000 |
| 100 | 200 | 4.5 | 15 ml Pphos | >120,000 |
|  |  | 6 |  | >120,000 |
| 3.0 | 180 | 1 to 12 | 1.0 ml Pphos | 10,000 to 15,000 |
| 30 | 190 | 6 | 4.5 ml $H_3PO_4$ | 40,000 |
| 3.0 | 180 | 8 | 0.15 ml Pphos, | 24,000 |
|  |  | 24 | 2.85 ml NMP[c] | 28,000 |
| 3.0 | 160 | 8 to 32 | 1.50 ml Pphos 1.50 ml NMP 0.75 ml tpp[b,d] | 31,000 |
| 2.0 | 160 | 8 to 48 | 2.5 ml NMP, 0.8 g P205 | 36,000 |
| 2.0 | 135 | 8 to 48 | 2.5 ml NMP, 0.8 g $P_2O_5$ | 47,200 |
| 2.0 | 135 | 8 | 2.5 ml NMP, | 29,000 |
|  |  | 24 | 1.25 ml MMPC, | 33,000 |
|  |  | 48 | 0.8 g $P_2O_5$ | 47,000 |
| 2.0 | 160 | 8 to 48 | 2.5 ml NMP, 1.25 ml MMP[b], 0.8 g $P_2O_5$ | 30,000 |
| 2.0 | 110 | 8 | 2.5 ml NMP, | 7,300 |
|  |  | 24 | 1.25 ml MMP, | 12,000 |
|  |  | 48 | 0.8 g $P_2O_5$ | 16,000 |
| 3.0 | 180 | 2 to 24 | 0.15 ml Pphos, 2.85 ml sulfolane[b] | 8,000 |

[a]Pphos = polyphosphoric acid (Sigma Chemical).
[b]Ueno and Nagaoka, 1984; Sakata et al., 1991; Kobayashi et al., 1990; Hayashi et al., 1985; 1986.
[c]NMP = N-methylpyrrolidone (Sigma-Aldrich Chemical).
[d]tpp = triphenylphosphite (Aldrich Chemical).
[e]MMP = 4-methlmorpholine (Aldrich Chemical).

TABLE 2

Estimate by Three Methods of Molecular Weights of Selected Polyaspartate Molecules.

| | Molecular Weight of Polyaspartate Sample | | | |
|---|---|---|---|---|
| Method | 1 | 2 | 3 | 4 |
| Viscosity (intrinsic viscosity) | 52,300 (32.8 ml/g) | 78,000 (42.1 ml/g) | 130,000 (59.0 ml/g) | 160,000 (67.1 ml/g) |
| Gel Permeation | 17,300 | 22,500 | 28,400 | 29,100 |
| Laser Light Scattering (multi-angle) | 17,900 | 23,800 | 27,400 | 30,800 |

TABLE 3

Gel volumes, gel strengths, and charge densities of selected AGM's.

| Inventive Example Number | Gel Volume (BD, saline) | Gel Strength $N/m^2$ | Charge Density $\mu$moles $COO^-$/mg |
|---|---|---|---|
| 5 | 27.9 | ** | 6.67 |
| 6 | 34.8 | ** | 7.59 |
| 9 | 35.5 | 2,334 | 7.45 |
| 10 | 59.0 | 348 | 7.32 |
| 11 | 55.6 | 452 | — |
| 12 | 70.9 | <300 | 6.79 |
| 13 | 87.6 | <300 | 6.99 |
| 14 | 24.1 | 5,767 | 7.23 |
| 16 | 50.7 | 860 | 7.56 |
| 27 | 32.5 | 3,521 | — |
| 31 | 33.5 | 3,677 | 6.28 |
| 32 | 34.0 | 3,596 | 6.40 |
| 38 | 37.6 | 2,339 | — |
| 39 | 45.7 | 1,062 | — |
| 40 | 60.0 | 918 | — |
| Comparative Example Number | | | |
| 18–21 | none | none | — |
| Note: Low MW polyaspartate, no AGM's produced | | | |
| 48 | 13.16 | 10,216 | 3.27 |
| Note: high MW polyaspartate, hydrolysis method of Nagatoma et al. | | | |
| commercial polyacrylate AGM | 30 | 3,522 | 10.81 |

**insufficient sample

TABLE 4

Amount of Free Amine Groups in Selected AGM's based on Ninhydrin Analysis.

| Sample | Gel Volume | Free Amines, Theoretical, $\mu$moles/g | Free Amines, Measured, $\mu$moles/g | % Single Crosslinks of Total Crosslinks |
|---|---|---|---|---|
| Thermally x-linked[a] Reactant Ratio Temperature, Time | | | | |
| 10:0.5, 180° C. 22 h | 35.0 | 215 | 17.7 | 8.23 |

TABLE 4-continued

Amount of Free Amine Groups in Selected AGM's based on Ninhydrin Analysis.

| Sample | Gel Volume | Free Amines, Theoretical, µmoles/g | Free Amines, Measured, µmoles/g | % Single Crosslinks of Total Crosslinks |
|---|---|---|---|---|
| 10:0.5, 180° C., 30 h | 30.0 | 215 | 15.1 | 7.01 |
| 10:0.5, 180° C., 48 h | 19.5 | 215 | 4.92 | 2.29 |
| 10:1.0, 190° C., polyphos, 6 h | 14.8 | 413 | 5.67 | 1.37 |
| DCC x-linked[b] Reactant Ratio, 24 h, Room Temp | | | | |
| 10:2:1 | 24.0 | 413 | 15.1 | 3.65 |
| 10:1.75:0.875 | 59.0 | 360 | 35.6 | 9.88 |
| 10:1.5:0.75 | 55.7 | 314 | 38.4 | 12.2 |
| 10:1.25:0.625 | 70.9 | 268 | 38.6 | 14.4 |
| 10:1:0.5 | 87.6 | 215 | 31.0 | 14.4 |
| Nucleophilic x-linked[b] in NMP, Reactant Ratio, Time, Temperature | | | | |
| 10:1 24 h Room Temp | 22.5 | 413 | 11.7 | 2.84 |
| 10:1 3 h 60° C. | 39.2 | 413 | 36.1 | 8.75 |
| 10:1 6 h 60° C. | 36.7 | 413 | 37.0 | 8.96 |
| 10:1 24 h 60° C. | 36.8 | 413 | 17.9 | 4.35 |

[a]Reactants: polyaspartate of example 2, with 1,4 diaminobutane.2 HCl as crosslinker.
[b]Reactants: polyaspartimide of example 4, with 1,4 diaminobutane free base as crosslinker.

TABLE 5

Charge densities of molecules used in absorbent gelling materials, as determined by titration of COO⁻ groups (n = 3, ±S.D.).

| | Charge Density, µmoles COO⁻/mg | |
|---|---|---|
| Material | Theoretical Value | Titrated Value |
| Acrylate monomer | 13.88 | 13.71 ± 0.435 |
| Aspartate monomer | 14.91 | 10.41 ± 0.198 |
| Polyacrylate | 13.88 | 10.50 ± 0.302 |
| Polyaspartate | 8.54 | 7.20 ± 0.140 |

TABLE 6

Sodium content of selected polyaspartate AGM's.

| AGM of Example # | % Na₊ by weight AGM |
|---|---|
| 31 | 13.4 ± 2.61 (n = 30) |
| 32 | 12.8 ± 2.04 (n = 27) |
| 27, acid-precipitated, lyophilized, not neutralized | <0.1% (n = 27) |

The theoretical value of sodium content of the Na-aspartate residue in the AGM is 17.1% Na⁺ by weight. If 20% of the residues were bound in the crosslinks, (each crosslinker reacting with 2 residues), the value is 13.6% Na⁺ by weight.

What is claimed is:

1. A crosslinked polymer comprising a homopolymer of aspartic acid, said homopolymer being crosslinked with a crosslinking compound, said crosslinking compound having at least two amine functional groups, said crosslinked homopolymer exhibiting at least one of the following two minimum characteristics, (1) a saline gel volume, as measured by blue-dextran method of at least 15, and (2) a gel strength in excess of 300 N/m² as measured by a pulse shearometer when swollen to the maximum gel volume of said crosslinked homopolymer, and wherein said crosslinked homopolymer is water insoluble.

2. The crosslinked polymer of claim 1, wherein said crosslinking agent is a diamine.

3. The crosslinked polymer of claim 1, wherein said minimum gel strength is at least 3000 N/m².

4. The crosslinked polymer of claim 1, wherein said crosslinking agent is selected from the group consisting of diaminobutane, diaminopentane, diaminohexane, and diaminoheptane.

5. The crosslinked polymer of claim 1, wherein the ratio of said homopolymer to said crosslinking agent ranges from 150:1 to 10:3, expressed as moles of aspartic acid to moles of crosslinking agent.

6. The crosslinked polymer of claim 1, said homopolymer comprising polyaspartate units of 25,000–30,000 daltons (weight average molecular weight), wherein 3–30 percent of residues of said polyaspartate units have been crosslinked through said crosslinking compounds.

7. The crosslinked polymer of claim 1, wherein said homopolymer has an intrinsic viscosity of at least 40 ml/g.

8. The crosslinked polymer of claim 1, wherein said crosslinked homopolymer exhibits from 0–20 percent by weight extractable materials.

9. The crosslinked polymer of claim 8, wherein said amount of extractable materials varies from 0–10 percent by weight.

10. A crosslinked homopolymer of aspartic acid with an aqueous intrinsic viscosity of at least 30 ml/g, wherein said crosslinked homopolymer is soluble in water.

11. A homopolymer of aspartic acid, rendered insoluble in water by crosslinking said homopolymer with 3–30 percent, by weight, diamine crosslinking agents, wherein said homopolymer exhibits a gel strength of less than 300 N/m$^2$ as measured by a pulse shearometer, when said homopolymer is swollen to a maximum gel volume of said homopolymer.

* * * * *